United States Patent
Jang et al.

(10) Patent No.: US 12,531,291 B2
(45) Date of Patent: Jan. 20, 2026

(54) BATTERY PACK AND DEVICE INCLUDING THE SAME

(71) Applicant: LG ENERGY SOLUTION, LTD., Seoul (KR)

(72) Inventors: Byung Do Jang, Daejeon (KR); Donghyun Kim, Daejeon (KR); Yongho Chun, Daejeon (KR); Hyoungsuk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 744 days.

(21) Appl. No.: 17/800,476

(22) PCT Filed: Apr. 29, 2021

(86) PCT No.: PCT/KR2021/005439
§ 371 (c)(1),
(2) Date: Aug. 17, 2022

(87) PCT Pub. No.: WO2021/221478
PCT Pub. Date: Nov. 4, 2021

(65) Prior Publication Data
US 2023/0108219 A1    Apr. 6, 2023

(30) Foreign Application Priority Data

Apr. 29, 2020  (KR) ........................ 10-2020-0052253
Apr. 28, 2021  (KR) ........................ 10-2021-0055140

(51) Int. Cl.
*H01M 10/6556*    (2014.01)
*H01M 10/42*      (2006.01)
(Continued)

(52) U.S. Cl.
CPC ..... *H01M 10/6556* (2015.04); *H01M 10/425* (2013.01); *H01M 10/613* (2015.04);
(Continued)

(58) Field of Classification Search
CPC ................................................ H01M 10/6556
See application file for complete search history.

(56) References Cited

U.S. PATENT DOCUMENTS

| | | | |
|---|---|---|---|
| 10,003,112 B1 * | 6/2018 | Boor | ...................... B60L 58/26 |
| 2011/0206948 A1 * | 8/2011 | Asai | .................... H01M 10/617 |
| | | | 429/7 |

(Continued)

FOREIGN PATENT DOCUMENTS

| | | |
|---|---|---|
| CN | 107644960 A | 1/2018 |
| CN | 109962191 A | 7/2019 |

(Continued)

OTHER PUBLICATIONS

Extended European Search Report for European Application No. 21796250.5, dated Aug. 6, 2024.

(Continued)

*Primary Examiner* — Brian R Ohara
(74) *Attorney, Agent, or Firm* — Birch, Stewart, Kolasch & Birch, LLP

(57) ABSTRACT

A battery pack including: a plurality of battery modules configured to include a battery cell stack in which a plurality of battery cells are stacked, a module frame accommodating the battery cell stack, and a heat sink positioned under a bottom portion of the module frame; a pack frame configured to accommodate the plurality of battery modules; a pack refrigerant pipe assembly connected to the plurality of battery modules; and a pack refrigerant pipe housing configured to accommodate the pack refrigerant pipe assembly, wherein the plurality of battery modules include a first battery module and a second battery module facing each other, and wherein the pack refrigerant pipe assembly and the pack refrigerant pipe housing are positioned between the first battery module and the second battery module.

17 Claims, 16 Drawing Sheets

(51) Int. Cl.
  *H01M 10/613*  (2014.01)
  *H01M 10/625*  (2014.01)
  *H01M 10/647*  (2014.01)
  *H01M 10/6551* (2014.01)
  *H01M 50/211*  (2021.01)
  *H01M 50/505*  (2021.01)

(52) U.S. Cl.
  CPC ....... *H01M 10/625* (2015.04); *H01M 10/647* (2015.04); *H01M 10/6551* (2015.04); *H01M 50/211* (2021.01); *H01M 50/505* (2021.01); *H01M 2010/4271* (2013.01)

(56) References Cited

U.S. PATENT DOCUMENTS

| | | | |
|---|---|---|---|
| 2012/0156543 | A1 | 6/2012 | Cicero et al. |
| 2016/0141735 | A1 | 5/2016 | Motohashi et al. |
| 2018/0026243 | A1 | 1/2018 | Stojanovic et al. |
| 2018/0241102 | A1 | 8/2018 | Kim et al. |
| 2019/0319318 | A1 | 10/2019 | Park |
| 2020/0067155 | A1 | 2/2020 | Hwang et al. |
| 2020/0076019 | A1* | 3/2020 | Ohkuma ............. H01M 50/204 |
| 2020/0373637 | A1 | 11/2020 | Keum et al. |
| 2020/0395644 | A1 | 12/2020 | Brauning et al. |
| 2021/0066769 | A1 | 3/2021 | Hong et al. |
| 2021/0218089 | A1 | 7/2021 | Koyama |
| 2022/0376326 | A1 | 11/2022 | Chun et al. |

FOREIGN PATENT DOCUMENTS

| | | |
|---|---|---|
| CN | 110459715 A | 11/2019 |
| CN | 210006775 U | 1/2020 |
| EP | 4 040 577 A1 | 8/2022 |
| JP | 2014-192044 A | 10/2014 |
| JP | 2015-69845 A | 4/2015 |
| JP | 6130916 B2 | 5/2017 |
| JP | 2019-129042 A | 8/2019 |
| KR | 10-2017-0065906 A | 6/2017 |
| KR | 10-2018-0038310 A | 4/2018 |
| KR | 10-2019-0069120 A | 6/2019 |
| KR | 10-2020-0021608 A | 3/2020 |
| KR | 10-2089646 B1 | 3/2020 |
| WO | WO 2019/046012 A1 | 3/2019 |
| WO | WO 2019/225846 A1 | 11/2019 |
| WO | WO 2019/230325 A1 | 12/2019 |

OTHER PUBLICATIONS

International Search Report (PCT/ISA/210) issued in PCT/KR2021/005439, dated Aug. 6, 2021.

* cited by examiner

【Figure 1】
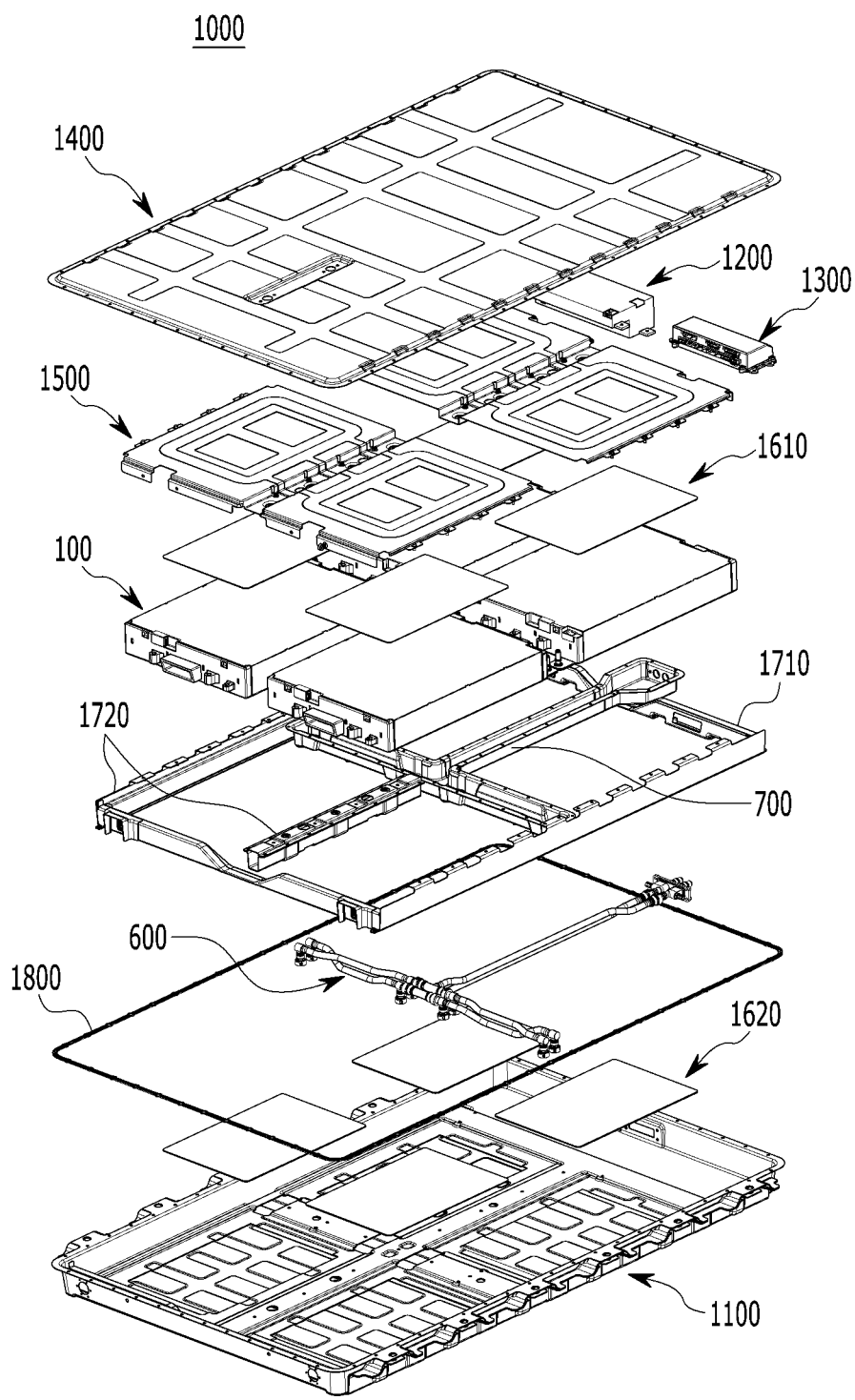

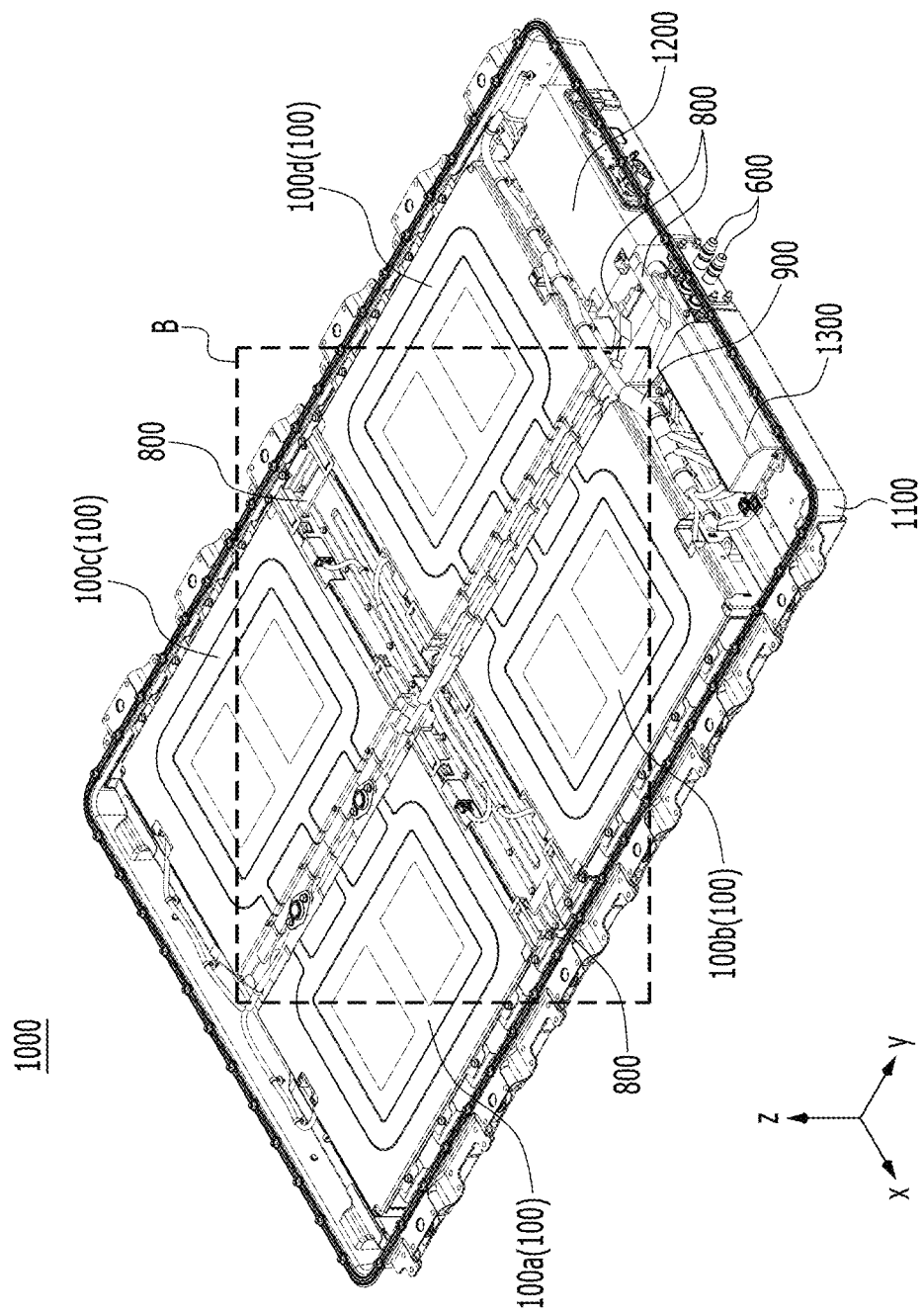
[Figure 2]

[Figure 3]
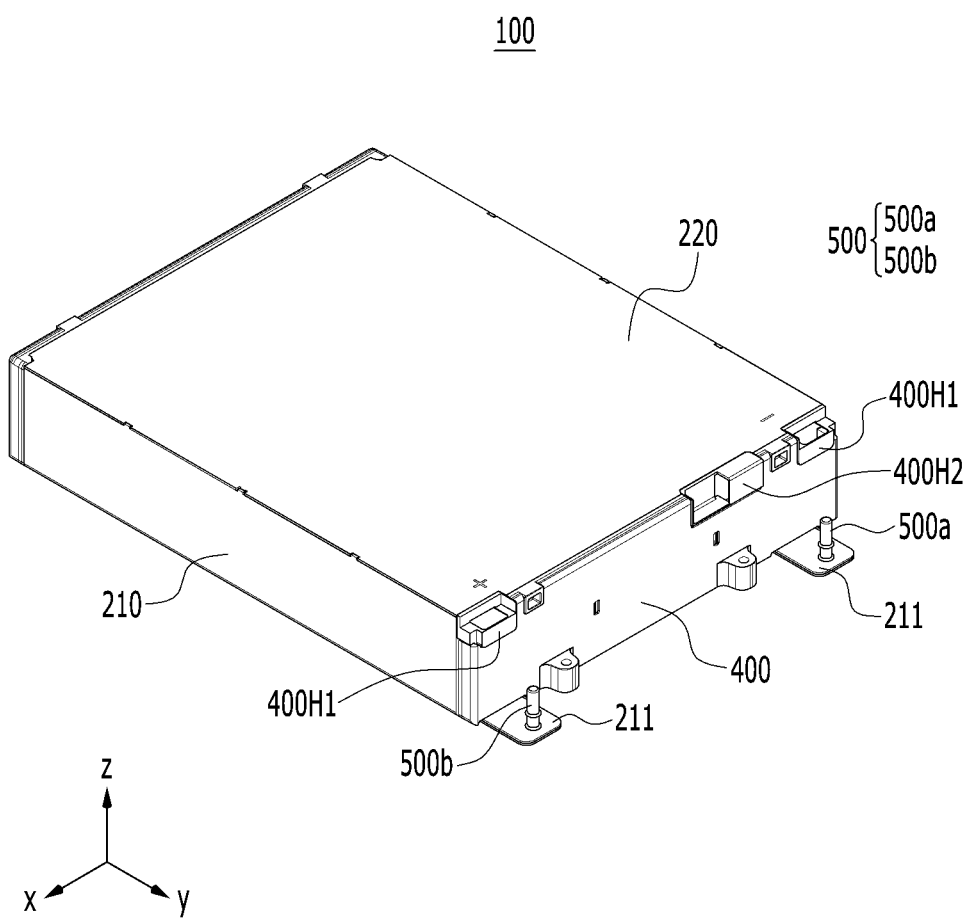

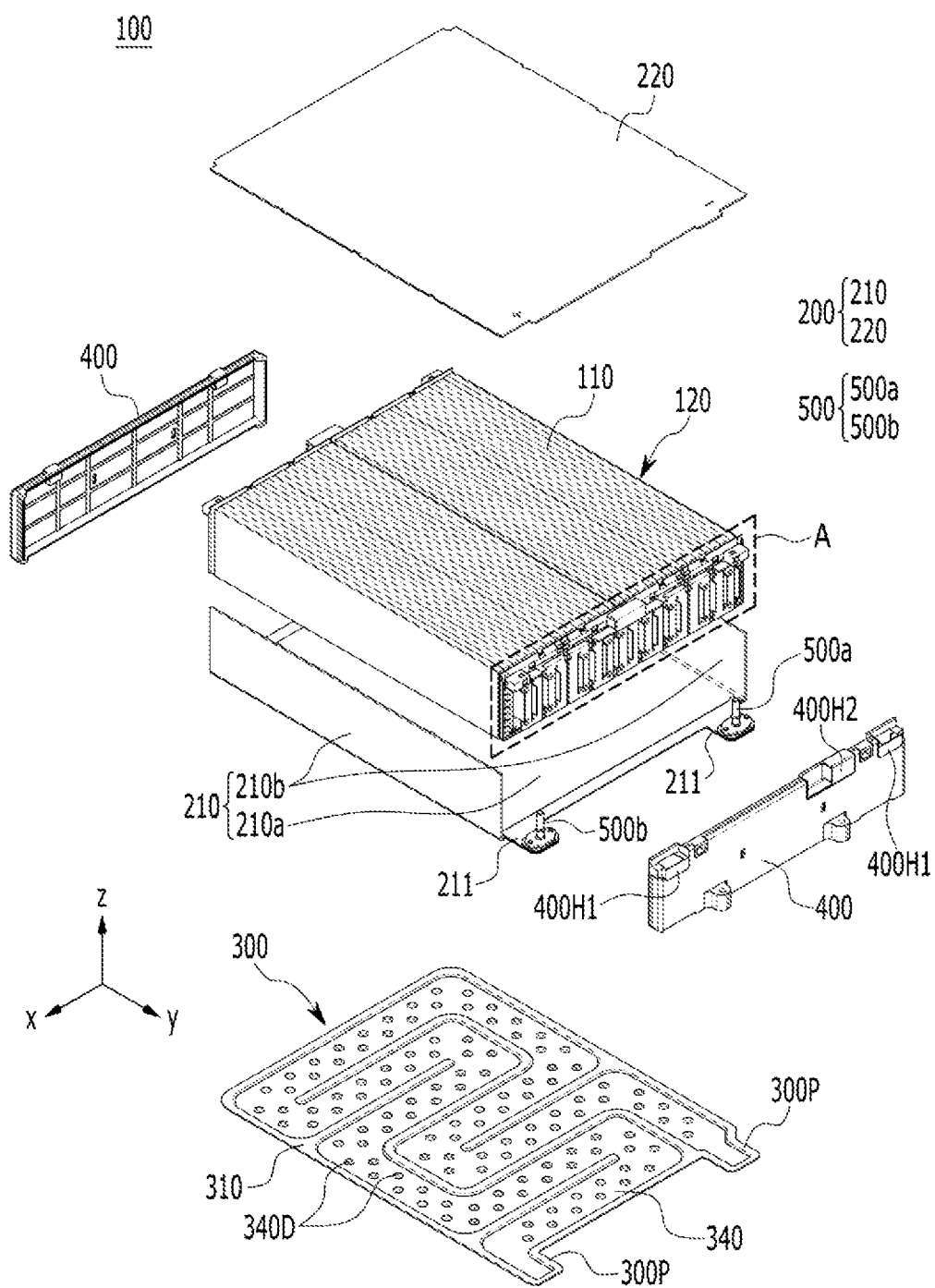
[Figure 4]

[Figure 5]
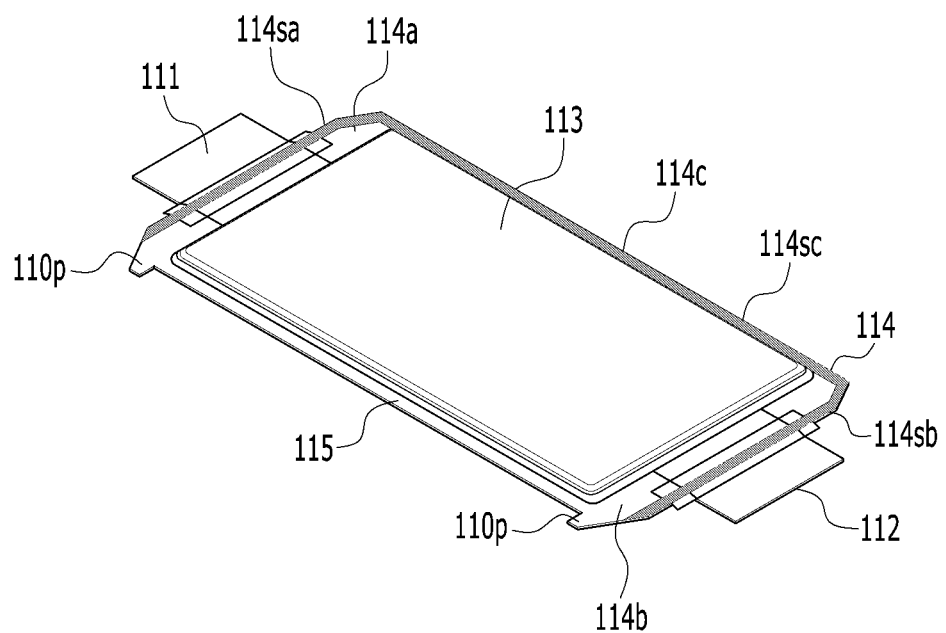

【Figure 6】
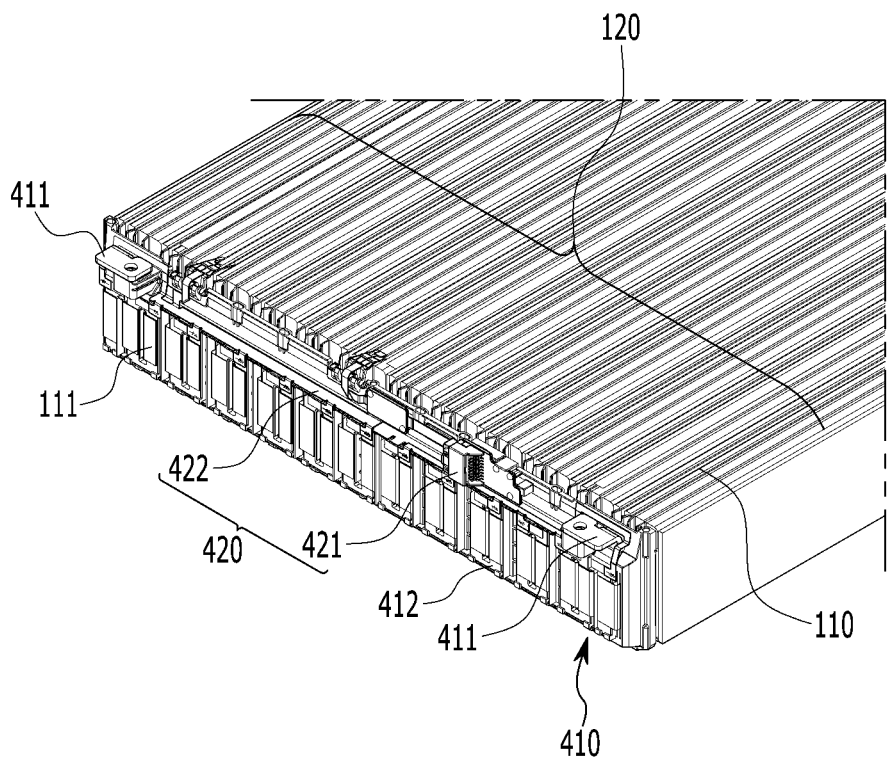
【Figure 7】
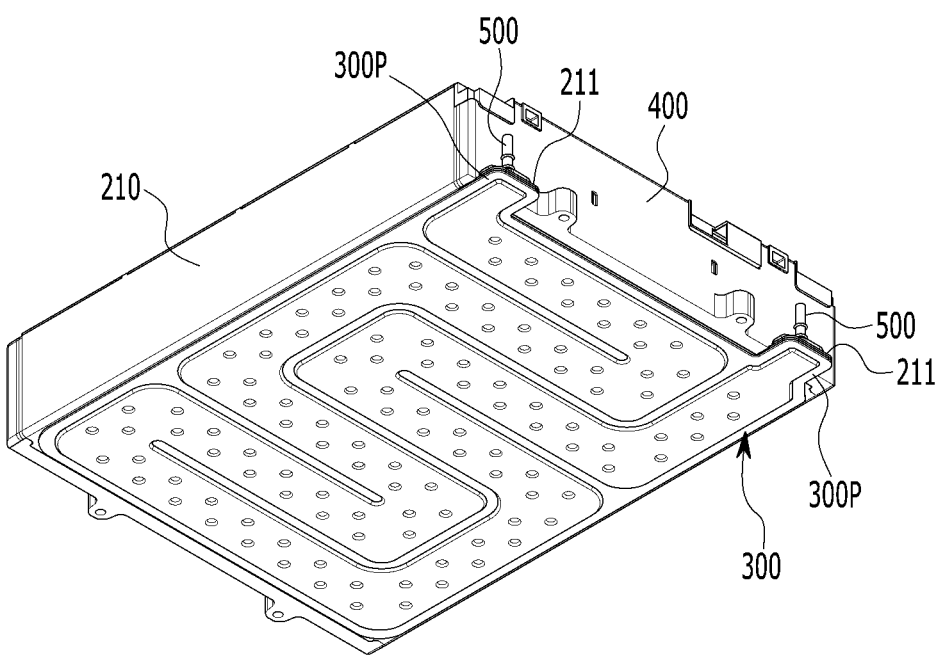

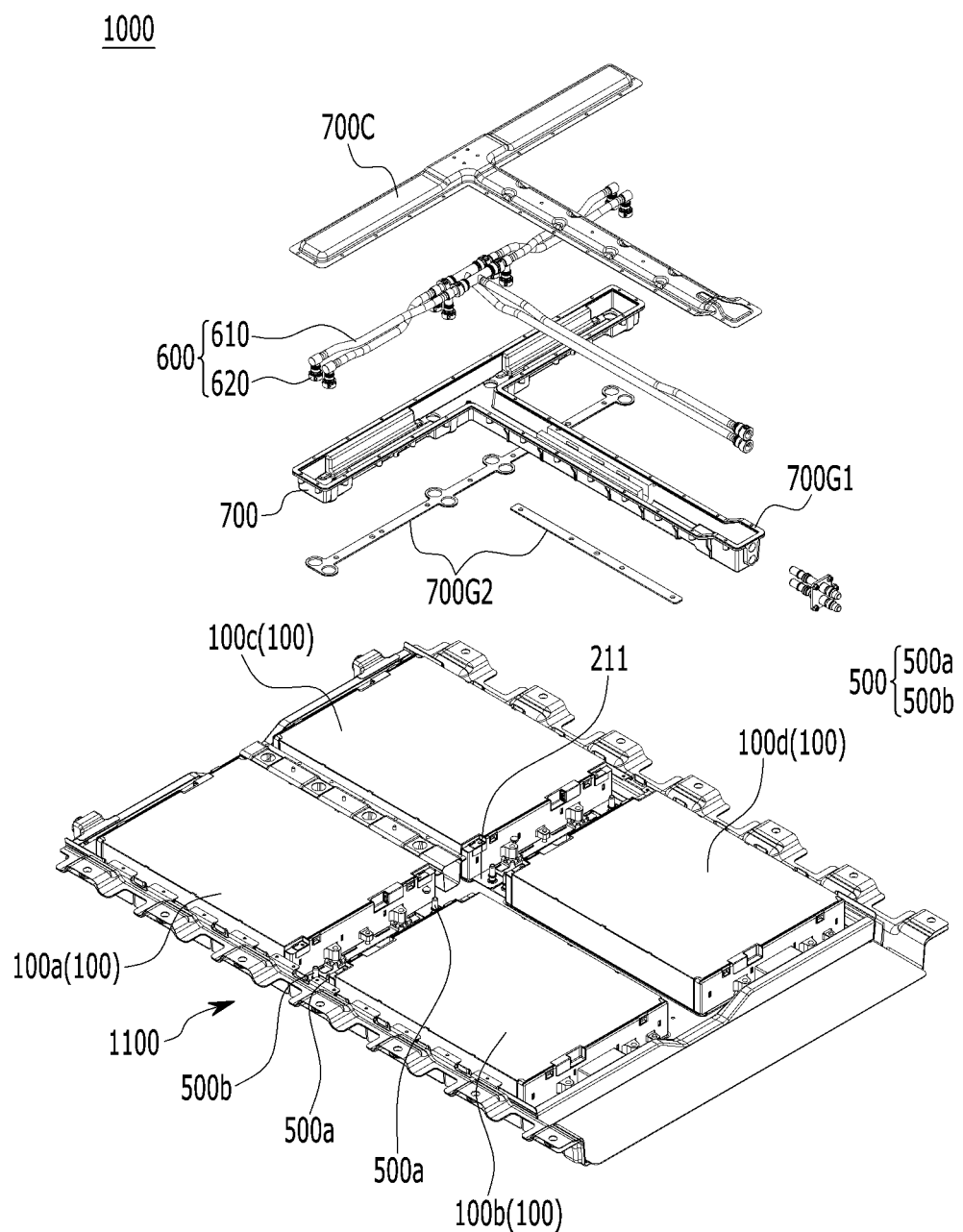
[Figure 8]

【Figure 9】
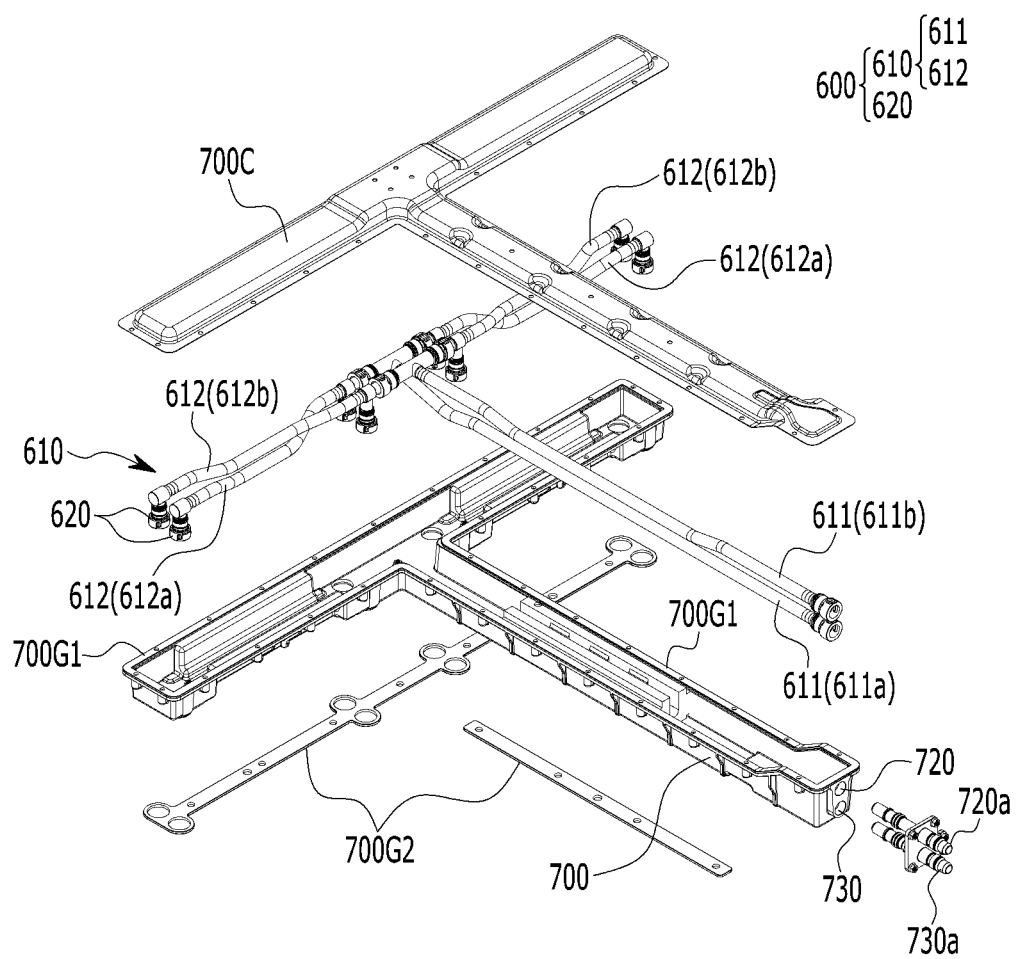

[Figure 10]
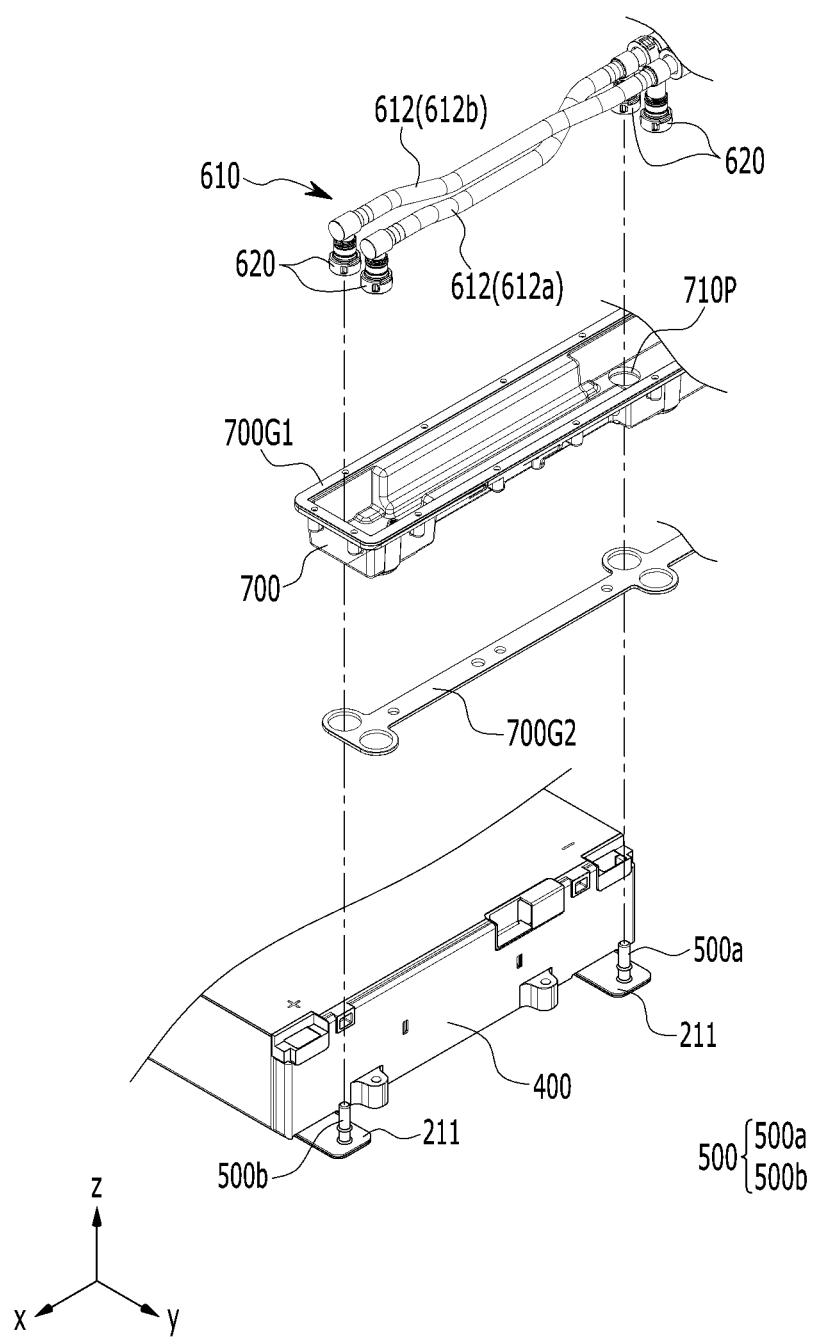

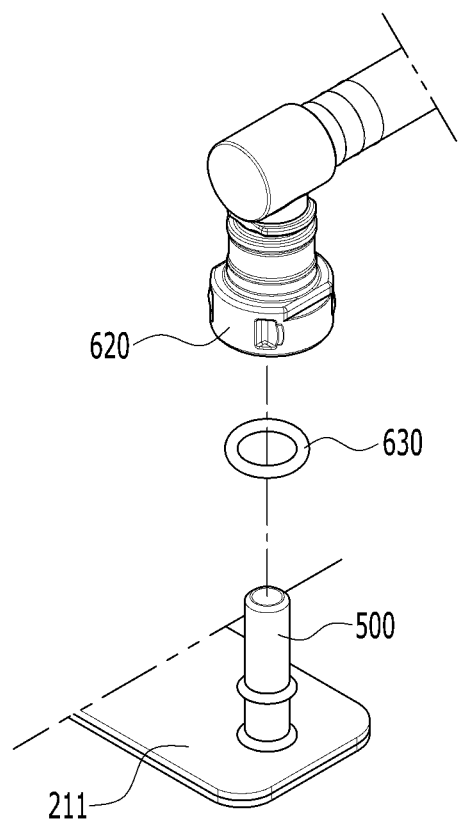
[Figure 11]

[Figure 12]
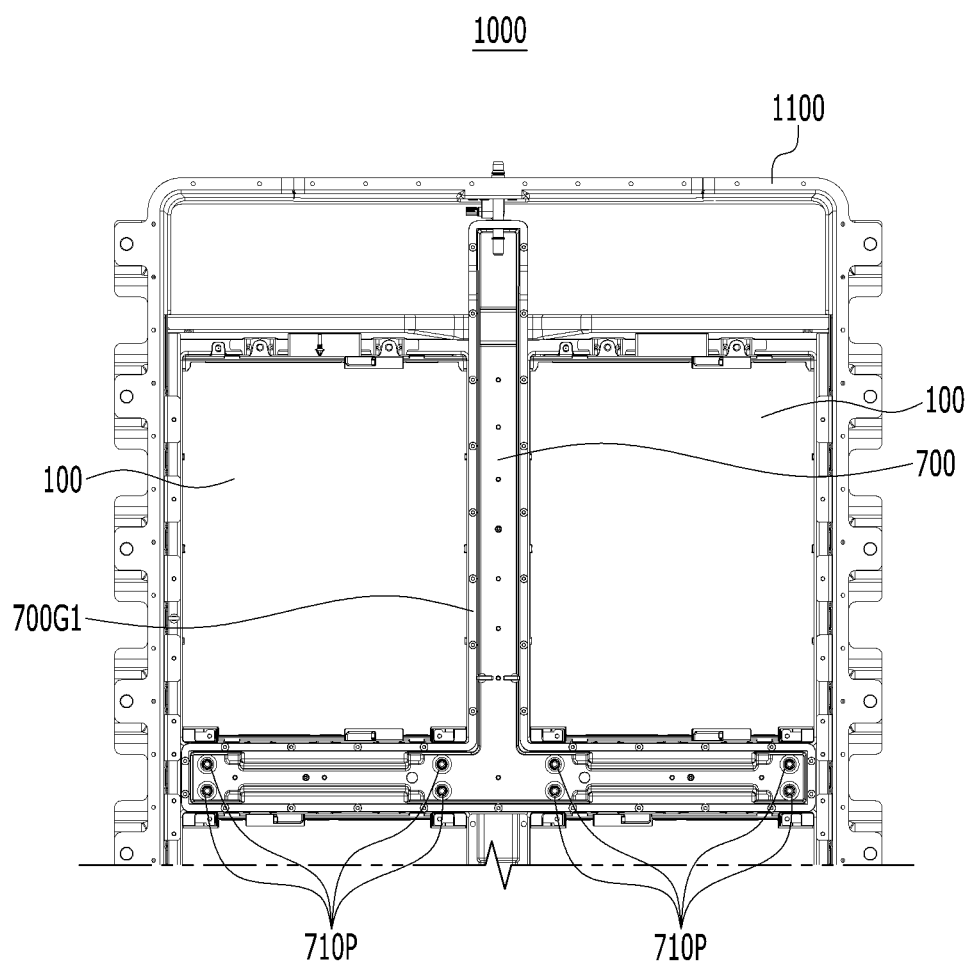

[Figure 13]
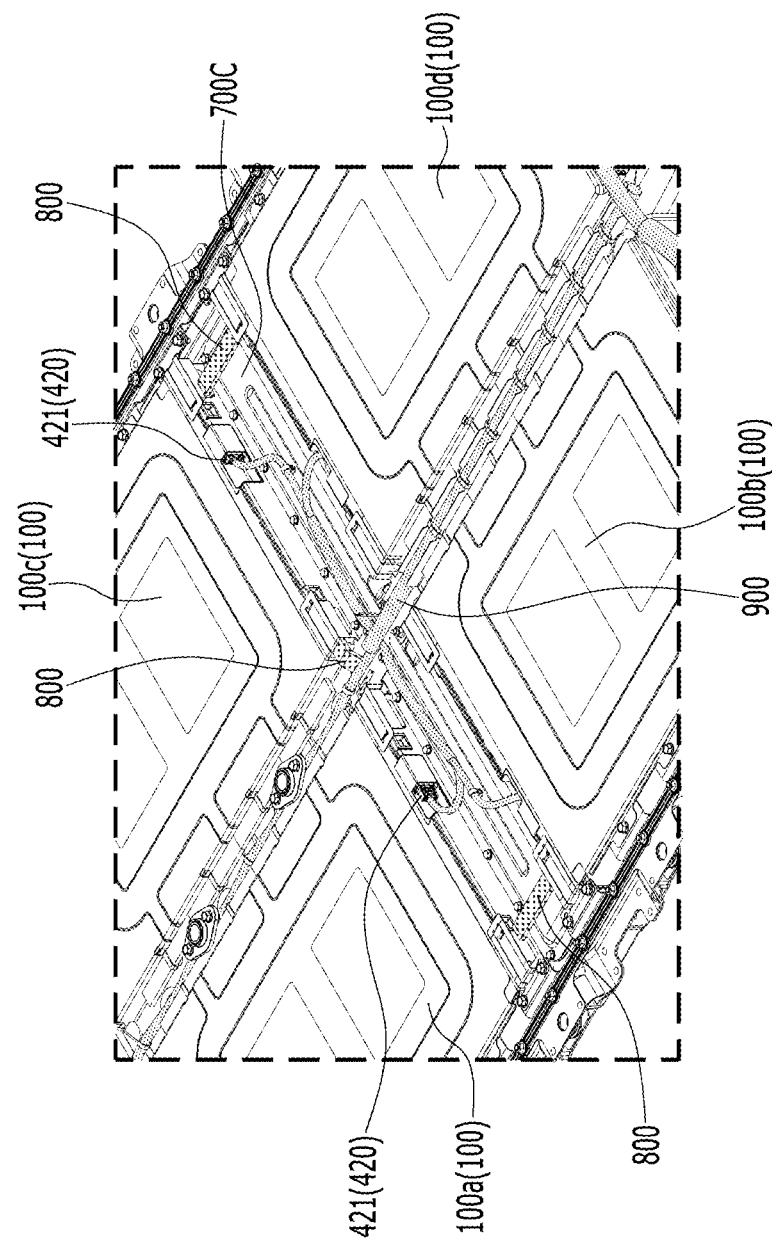

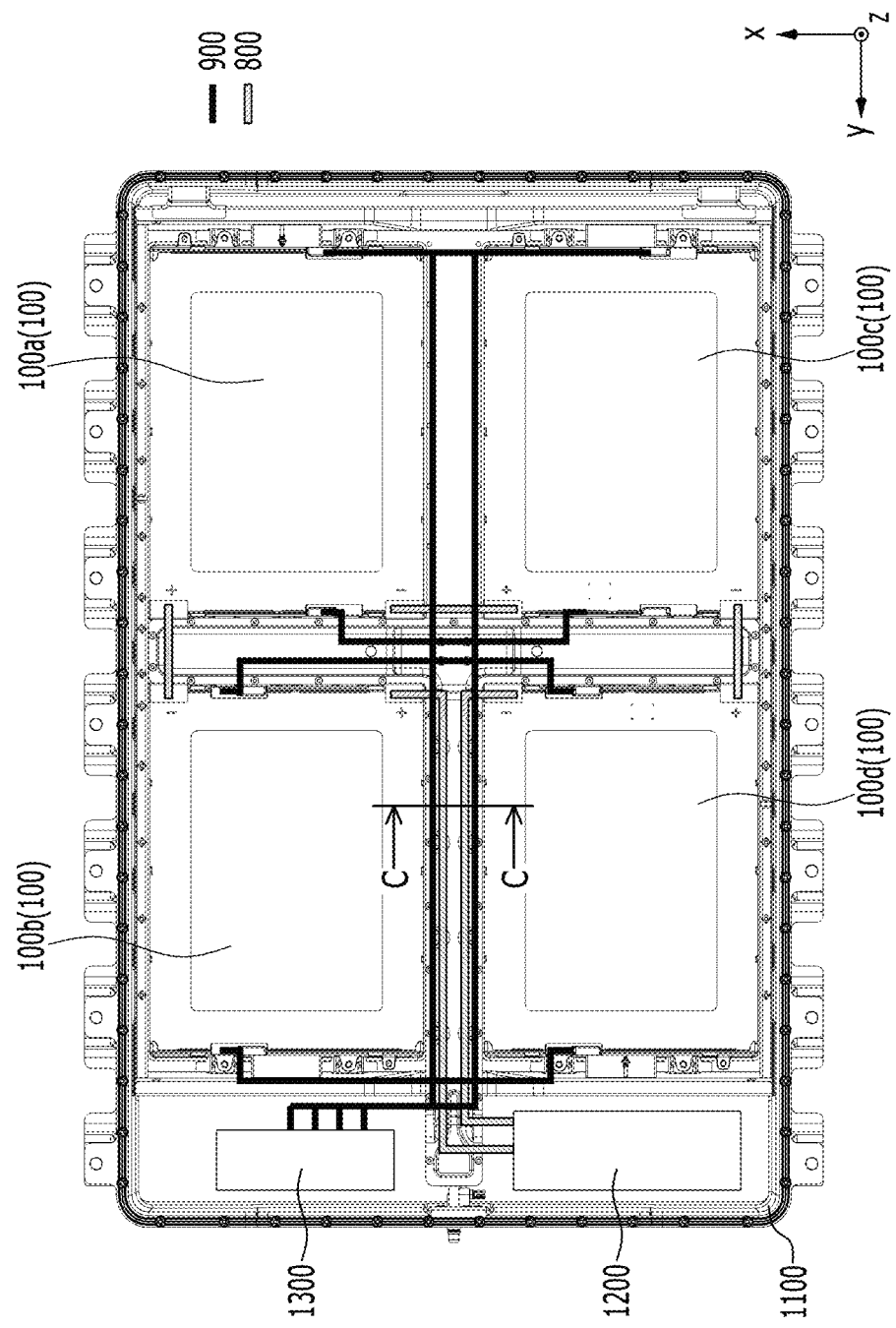
[Figure 14]

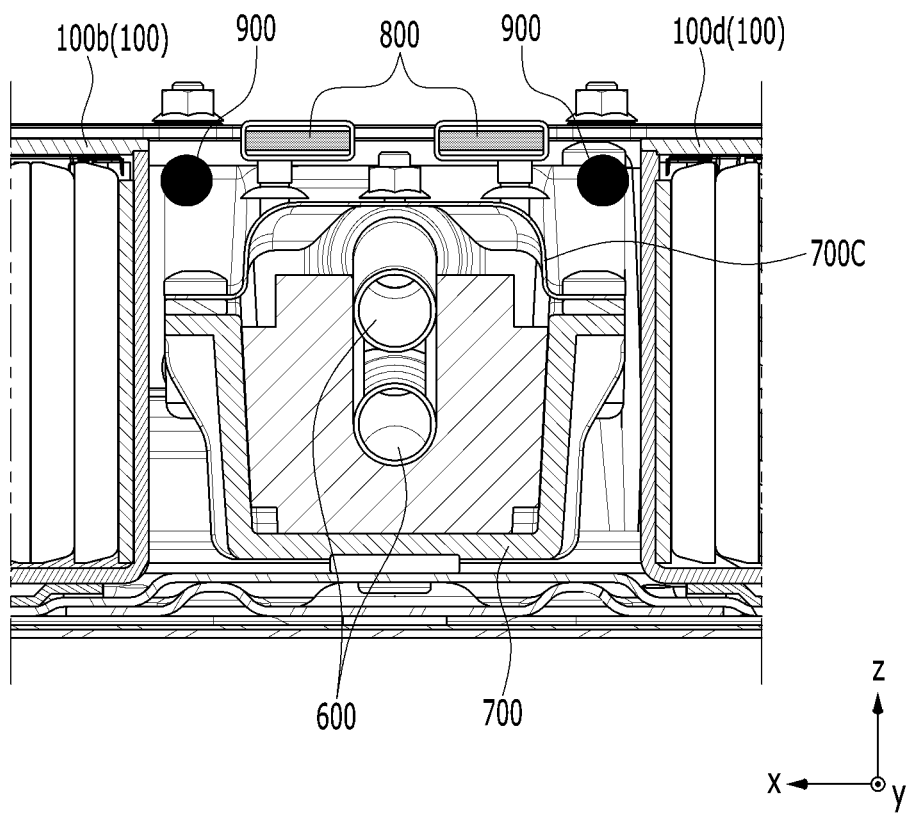
[Figure 15]

【Figure 16】
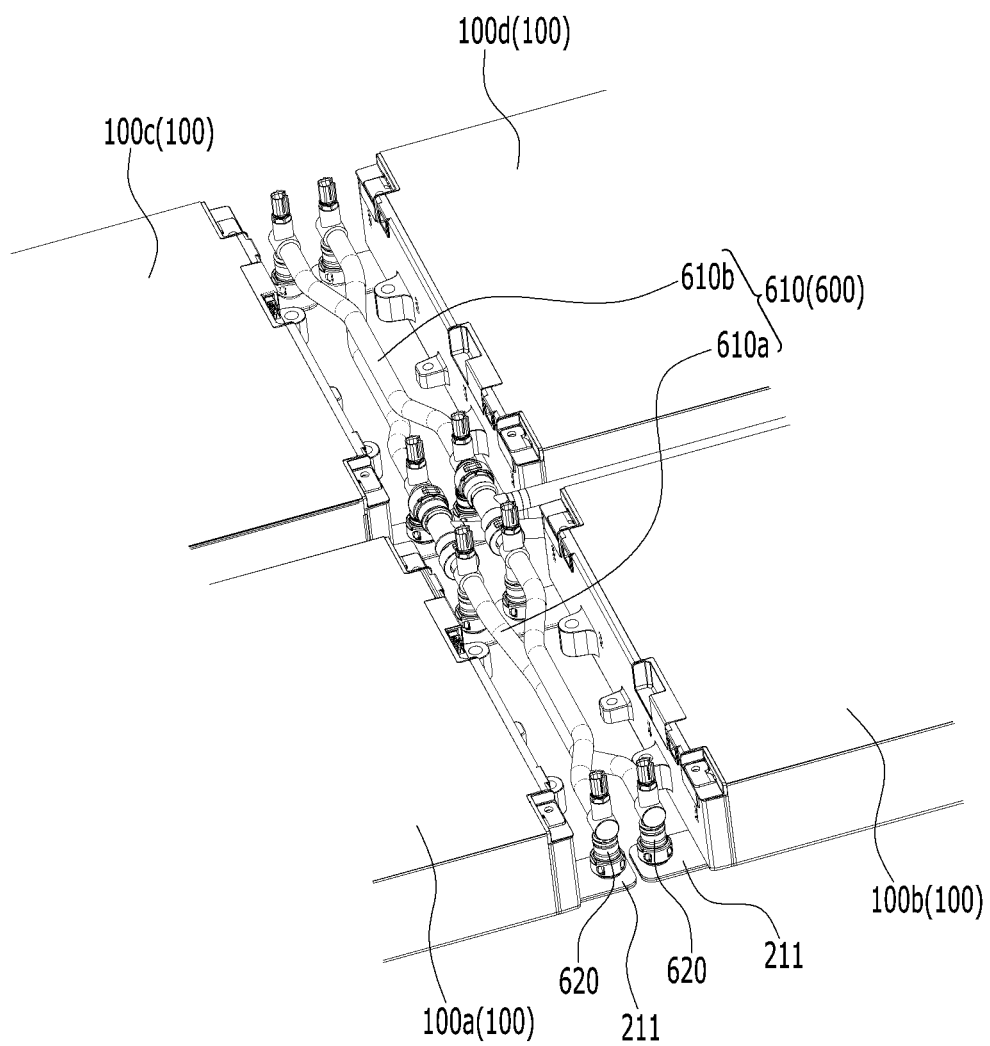

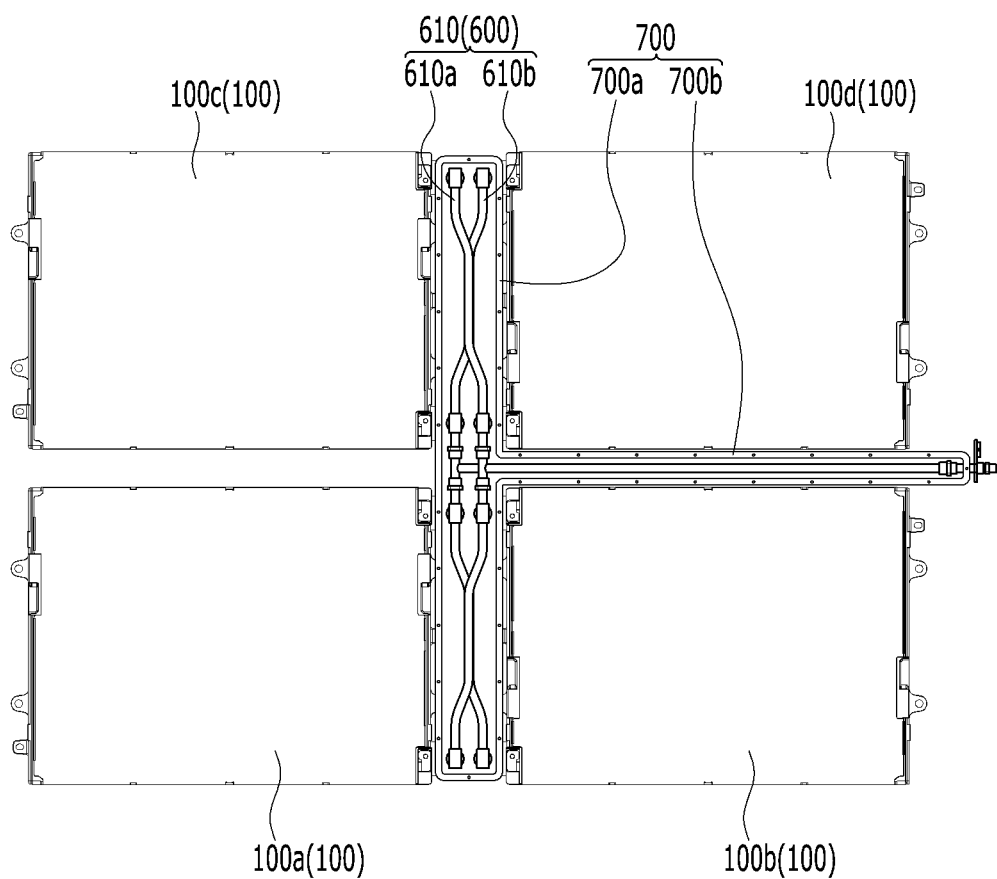
[Figure 17]

BATTERY PACK AND DEVICE INCLUDING THE SAME

TECHNICAL FIELD

Cross-Reference to Related Application(s)

This application claims priority to and benefits of Korean Patent Application No. 10-2020-0052253, filed in the Korean Intellectual Property Office on Apr. 29, 2020, and Korean Patent Application No. 10-2021-0055140, filed in the Korean Intellectual Property Office on Apr. 28, 2021, the entire contents of which are incorporated herein by reference.

The present invention relates to a battery pack and a device including the same, and more particularly, to a battery pack including a cooling-integrated large capacity battery module and a device including the same.

BACKGROUND ART

In modern society, as portable devices such as mobile phones, laptops, camcorders, and digital cameras are used in daily life, development of techniques related to mobile devices as described above is becoming active. In addition, a rechargeable battery capable of charging and discharging is a measure to solve air pollution such as from conventional gasoline vehicles using fossil fuels, is used as a power source for electric vehicles (EVs), hybrid electric vehicles (HEVs), and plug-in hybrid electric vehicles (P-HEV), and thus a need for development of rechargeable batteries is increasing.

Currently commercially available rechargeable batteries include a nickel cadmium battery, a nickel hydrogen battery, a nickel zinc battery, and a lithium rechargeable battery, and among them, the lithium rechargeable battery has little memory effect compared to nickel-based rechargeable batteries, so it is in the spotlight as it is freely charged and discharged, has a very low self-discharge rate, and has high energy density.

Such a lithium rechargeable battery mainly uses a lithium-based oxide and a carbon material as a positive electrode active material and a negative electrode active material, respectively. The lithium rechargeable battery includes an electrode assembly in which a positive electrode plate and a negative electrode plate to which a positive electrode active material and a negative electrode active material are respectively applied with a separator therebetween, and a battery case for sealing and housing the electrode assembly together with an electrolyte.

In general, a lithium rechargeable battery may be classified into a can-type rechargeable battery in which an electrode assembly is embedded in a metal can, and a pouch-type rechargeable battery in which an electrode assembly is embedded in a pouch of an aluminum laminate sheet depending on a shape of an exterior material.

In the case of rechargeable batteries used for small devices, 2 to 3 battery cells are positioned, but in the case of rechargeable batteries used for mid- to large-sized devices such as vehicles, a battery module in which a plurality of battery cells are electrically connected is used. In such a battery module, a plurality of battery cells are connected in series or parallel to each other to form a battery cell stack, thereby improving capacity and output. In addition, one or more battery modules may be mounted together with various control and protection systems, such as a battery disconnect unit (BDU), a battery management system (BMS), and a cooling system, to constitute a battery pack.

The battery pack must satisfy various functions. First, structural durability against various environments, vibrations, and shocks must be satisfied. Second, battery cells inside the battery pack generate electrical energy and radiate heat, and thus a cooling system is essential to cool it. Finally, a high voltage (HV) line for electrical connection and a low voltage (LV) line to which sensors for diagnosing an internal state of a battery module are connected are required. They form a complex structure within a limited space, which may cause inefficiency in an assembly process.

Accordingly, it is necessary to develop a battery pack with a simplified cooling structure and simple and intensive arrangement of internal components and battery modules to increase capacity, space utilization, and assembly.

The above information disclosed in this Background section is only for enhancement of understanding of the background of the invention, and therefore, it may contain information that does not form the prior art that is already known in this country to a person of ordinary skill in the art.

DISCLOSURE

Technical Problem

The present invention has been made in an effort to provide a battery pack with improved assembly process and space utilization by simplifying internal components and cooling structures together with an increase in capacity, and a device including the same.

However, the problem to be solved by the exemplary embodiments of the present invention is not limited to the above-described problems, and can be variously extended within the scope of the technical spirit included in the present invention.

Technical Solution

An embodiment of the present invention provides a battery pack including: a plurality of battery modules configured to include a battery cell stack in which a plurality of battery cells are stacked, a module frame accommodating the battery cell stack, and a heat sink positioned under a bottom portion of the module frame; a pack frame configured to accommodate the battery modules; a pack refrigerant pipe assembly connected to the battery modules; and a pack refrigerant pipe housing configured to accommodate the pack refrigerant pipe assembly. The battery modules include a first battery module and a second battery module facing each other, and the pack refrigerant pipe assembly and the pack refrigerant pipe housing are positioned between the first battery module and the second battery module.

The battery modules may each include cooling ports for supplying a refrigerant to the heat sink and discharging the refrigerant from the heat sink. An opening may be formed in a bottom surface of the pack refrigerant pipe housing, and the cooling ports may be connected to the pack refrigerant pipe assembly through the opening.

The cooling ports may include a refrigerant injection port for supplying a refrigerant to the heat sink and a refrigerant discharge port for discharging the refrigerant from the heat sink.

The module frame may include a module frame protrusion protruding from the bottom portion of the module frame, and the cooling ports may be positioned on an upper surface of the module frame protrusion to extend through the opening and to be connected to the pack refrigerant pipe assembly.

The module frame protrusion of the first battery module may protrude in a direction in which the second battery module is positioned, and the module frame protrusion of the second battery module may protrude in a direction in which the first battery module is positioned.

The pack refrigerant pipe assembly may include a pack refrigerant pipe and a connection port connecting the pack refrigerant pipe and the cooling ports. The connection port may penetrate the opening to be coupled to the cooling ports.

The battery module further may include a third battery module and a fourth battery module facing each other. The pack refrigerant pipe assembly and the pack refrigerant pipe housing may be positioned to extend between the first battery module and the second battery module, between the third battery module and the fourth battery module, and between the second battery module and the fourth battery module, to form a T-shaped structure.

The battery modules may each include a terminal bus bar connected to the battery cells and a sensing assembly for transferring information of the battery cells, and An HV line connected to the terminal bus bar and an LV line connected to the sensing assembly may be positioned between the first battery module and the second battery module.

The battery module may further include an end plate bonded to the module frame, and the terminal bus bar and the sensing assembly may be respectively exposed to be connected to the HV line and the LV line in the end plate. The first battery module and the second battery module may be arranged such that the end plate of the first battery module and the end plate of the second battery module face each other.

The battery pack may include a battery disconnect unit (BDU) module configured to control electrical connection of the battery modules, and a battery management system (BMS) module configured to monitor and control an operation of the battery module. At least one of the battery modules and the BDU module may be connected through the HV line, and at least one of the battery modules and the BMS module may be connected through the LV line.

The battery pack may further include a housing cover configured to cover an upper portion of the pack refrigerant pipe housing, and the HV line and the LV line may be positioned above the housing cover.

The bottom portion of the module frame and the heat sink may constitute a path of the refrigerant, and the bottom portion of the module frame may be in contact with the refrigerant.

The heat sink may include a lower plate bonded to the bottom portion of the module frame and a recess portion formed downwardly from the lower plate.

The battery cells may each be a pouch-type battery cell having a rectangular sheet structure, and the battery modules may include 32 to 45 battery cells.

Advantageous Effects

According to the embodiments of the present invention, it is possible to simplify internal components and structures constituting a battery pack together with an increase in capacity through a cooling-integrated large capacity battery module in which a number of included battery cells is increased. In particular, capacity and space utilization may be increased by intensively arranging a cooling structure and other components together with a battery module.

The effects of the present invention are not limited to the effects mentioned above, and other effects not mentioned can be clearly understood by those skilled in the art from the description of the claims.

DESCRIPTION OF THE DRAWINGS

FIG. 1 illustrates an exploded perspective view of a battery pack according to an embodiment of the present invention.

FIG. 2 illustrates a perspective view showing an assembled configuration of the battery pack of FIG. 1 except for a pack cover.

FIG. 3 illustrates a perspective view of a battery module included in the battery pack of FIG. 1.

FIG. 4 illustrates an exploded perspective view showing the battery module of FIG. 3.

FIG. 5 illustrates a perspective view of a battery cell included in the battery module of FIG. 4.

FIG. 6 illustrates a partial perspective view showing an enlarged portion "A" of FIG. 4.

FIG. 7 illustrates a perspective view of the battery module of FIG. 3 viewed from a bottom to a top of the battery module along a z-axis direction.

FIG. 8 illustrates an exploded perspective view showing battery modules, a pack refrigerant pipe assembly, and a pack refrigerant pipe housing included in the battery pack of FIG. 2.

FIG. 9 illustrates an exploded perspective view showing a pack refrigerant pipe assembly, and a pack refrigerant pipe housing included in the battery pack of FIG. 8.

FIG. 10 illustrates a perspective view showing a portion of each of a battery module, a pack refrigerant pipe, a pack refrigerant pipe housing, and a second gasket according to an embodiment of the present invention.

FIG. 11 illustrates a partial view showing a connection port and a cooling port according to an embodiment of the present invention.

FIG. 12 illustrates a top plan view showing a battery pack when viewed from top to bottom such that a bottom surface of a pack refrigerant pipe housing is visible according to an embodiment of the present invention.

FIG. 13 illustrates a partial view showing an enlarged portion "B" of FIG. 2.

FIG. 14 illustrates a top plan view showing the battery pack of FIG. 2 viewed in a −z-axis direction on an xy plane.

FIG. 15 illustrates a cross-sectional view taken along a line C-C of FIG. 14.

FIG. 16 illustrates a partial perspective view showing a connection relationship between battery modules and a pack refrigerant pipe assembly included in the battery pack of FIG. 2.

FIG. 17 illustrates a top plan view showing a connection relationship between battery modules and a pack refrigerant pipe assembly included in the battery pack of FIG. 2 as viewed on an xy plane.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

FIG. 1 illustrates an exploded perspective view of a battery pack according to an embodiment of the present invention. FIG. 2 illustrates a perspective view showing an assembled configuration of the battery pack of FIG. 1 except for a pack cover. FIG. 3 illustrates a perspective view of a battery module included in the battery pack of FIG. 1. FIG. 4 illustrates an exploded perspective view showing the battery module of FIG. 3.

Referring to FIG. 1 to FIG. 4, a battery pack according to an embodiment of the present invention includes a plurality of battery modules 100, a pack frame 1100 accommodating the battery modules 100, and a pack refrigerant pipe assembly 600 connected to the battery modules 100. The battery modules 100 each include a battery cell stack 120 in which the battery cells 110 are stacked, a module frame 200 accommodating the battery cell stack 120, and a heat sink 300 positioned below a bottom portion 210a of the module frame 200. The bottom portion 210a of the module frame 200 constitutes an upper plate of the heat sink 300. Meanwhile, the battery module 100 may include 32 to 48 battery cells 110 to form a cooling-integrated large capacity battery module 100. A structure of the heat sink 300 and a number of battery cells 110 will be described later.

FIG. 5 illustrates a perspective view of a battery cell included in the battery module of FIG. 4.

Referring to FIG. 4 and FIG. 5, the battery cell 110 may be a pouch-type battery cell. Such a pouch-type of battery cell may be formed by accommodating an electrode assembly in a pouch case of a laminate sheet including a resin layer and a metal layer, and then thermally fusing an outer periphery of the pouch case. The battery cells 110 may be formed to have a rectangular sheet-like structure. Specifically, each of the battery cells 110 according to the present embodiment has a structure in which two electrode leads 111 and 112 face each other and protrude from a first end portion 114a and a second end portion 114b of a cell body 113, respectively. The battery cell 110 may be manufactured by attaching the opposite end portions 114a and 114b of the battery case 114 and one side portion 114c connecting them in a state in which the electrode assembly (not illustrated) is accommodated in the battery case 114. In other words, the battery cell 110 according to the present embodiment has a total of three sealing portions 114sa, 114sb, and 114sc, the sealing portions 114sa, 114sb, and 114sc are sealed by a method such as thermal fusion, and the other one side portion may be formed as a connection portion 115. A direction between the opposite end portions 114a and 114b of the battery case 114 may be defined as a longitudinal direction of the battery cell 110, and a direction between the one side portion 114c connecting the opposite end portions 114a and 114b of the battery case 114 and the connection portion 115 may be defined as a width direction of the battery cell 110.

The connection portion 115 is a region extending along one edge of the battery cell 110, and a bat-ear 110p may be formed at an end portion of the connection portion 115. The bat-ear 110p may be formed on at least one of opposite end portions of the connection portion 115, and may protrude in a direction that is perpendicular to a direction in which the connection portion 115 extends. The bat-ear 110p may be positioned between one of the sealing portions 114sa and 114sb of the opposite end portions 114a and 114b of the battery case 114 and the connection portion 115.

The battery cells 110 may be configured in a plurality, and may be stacked to be electrically connected to each other to constitute the battery cell stack 120. In particular, as illustrated in FIG. 4, the battery cells 110 may be stacked in a direction that is parallel to an x-axis. The battery case 114 generally has a laminate structure of resin layer/metal thin film layer/resin layer. For example, in a case where a surface of the battery case is formed as an O (oriented)-nylon layer, when stacking a plurality of battery cells to form a medium or large-sized battery module, it tends to slide easily due to an external impact. Accordingly, in order to prevent this problem and maintain a stable stacked structure of battery cells, the battery cell stack 120 may be formed by attaching adhesives such as double-sided tape or an adhesive member such as a chemical adhesive that is bonded by a chemical reaction during adhesion on a surface of the battery case.

The battery cell stack 120 according to an embodiment of the present invention may be a large-scaled module in which the number of battery cells 110 is greater than that of the prior art. Specifically, 32 to 48 battery cells 110 for the battery module 100 may be included. In the case of such a large-scaled module, a horizontal length of the battery module is increased. Herein, the horizontal length may indicate a length in a direction in which the battery cells 110 are stacked, that is, in a direction that is parallel to the x-axis.

The module frame 200 accommodating the battery cell stack 120 may include an upper cover 220 and a U-shaped frame 210.

The U-shaped frame 210 may include a bottom portion 210a and two side portions 210b extending upward from opposite ends of the bottom portion 210a. The bottom portion 210a may cover a lower surface of the battery cell stack 120, and the side portion 210b may cover opposite side surfaces of the battery cell stack 120.

The upper cover 220 may be formed to have a plate-shaped structure that covers a lower surface thereof that is surrounded by the U-shaped frame 210 and an upper surface thereof (z-axis direction) other than the opposite side surfaces. The upper cover 220 and the U-shaped frame 210 may form a structure that covers the battery cell stack 120 up, down, left, and right by being coupled by welding or the like in a state in which corresponding corner portions thereof are in contact with each other. The battery cell stack 120 may be physically protected through the upper cover 220 and the U-shaped frame 210. To this end, the upper cover 220 and the U-shaped frame 210 may include a metal material having predetermined strength.

Meanwhile, although not specifically illustrated, the module frame 200 according to a variation may be a mono frame in the form of a metal plate in which an upper surface, a lower surface, and opposite side surfaces are integrated. That is, the U-shaped frame 210 and the upper cover 220 are not mutually coupled, but may be manufactured by extrusion molding to have a structure in which the upper surface, the lower surface, and opposite side surfaces are integrated.

The end plate 400 may be formed to cover the battery cell stack 120 by being positioned on corresponding open sides (y-axis direction and −y-axis direction) of the module frame 200. That is, two end plates 400 are positioned at opposite open sides of the module frame 200, and may be bonded to the module frame 200 by welding or the like. The end plate 400 may physically protect the battery cell stack 120 and other electrical components from external impact.

The battery module 100 according to the present embodiment may include a cooling port 500, may supply a refrigerant to the heat sink 300 through the cooling port 500, and may discharge the refrigerant from the heat sink 300. Specifically, the cooling port 500 may include a refrigerant injection port 500a and a refrigerant discharge port 500b that are spaced apart from each other. In addition, the refrigerant injection port 500a and the refrigerant discharge port 500b may be connected to the pack refrigerant pipe assembly 600. The heat sink 300 and the pack refrigerant pipe assembly 600 according to the present embodiment will be described again with reference to FIG. 7 and FIG. 8.

The module frame 200 according to the present embodiment may include a module frame protrusion 211 protruding from the bottom portion 210a of the module frame 200 to extend through the end plate 400. In this case, the refrigerant introduced or discharged by the cooling port 500 positioned on an upper surface of the module frame protrusion 211 may be supplied to or discharged from the heat sink 300 through the module frame protrusion 211.

Specifically, the module frame protrusion 211 may include a first module frame protrusion and a second module frame protrusion which are spaced apart from each other at a side of the module frame 200, the refrigerant injection port 500a is positioned on the first module frame protrusion, and the refrigerant discharge port 500b may be positioned on the second module frame protrusion.

Hereinafter, a terminal bus bar 411 and a sensing assembly 420 will be described in detail with reference to FIG. 6 and the like.

FIG. 6 illustrates a partial perspective view showing an enlarged portion "A" of FIG. 4.

Referring to FIG. 3 to FIG. 6, the battery module 100 according to the present embodiment may include the terminal bus bar 411 connected to the battery cell 110 and the sensing assembly 420 for transferring information of the battery cell 110. Herein, the information of the battery cell 110 may be temperature information or voltage information of the battery cell 110.

Specifically, the battery module 100 may include a bus bar frame 410 positioned in a protruding direction of the electrode lead 111 protruding from the battery cell 110. A terminal bus bar 411, a bus bar 412, and the sensing assembly 420 may be mounted on the bus bar frame 410.

The bus bar 412 serves to electrically connect the battery cells 110 included in the battery cell stack 120. The electrode lead 111 of the battery cell 110 may extend through a slit formed in the bus bar frame 410, and then to be bent to be connected to the bus bar 412. Accordingly, the battery cells 110 may be connected in series or in parallel.

The terminal bus bar 411 may be connected to the electrode lead 111 of the battery cells 110, and a first end thereof may be exposed to the outside of the battery module 100, so as to serve to electrically connect the battery cells 110 to the outside. Specifically, a terminal bus bar opening 400H1 may be formed in the end plate 400, and a portion of the terminal bus bar 411 may be exposed to the outside through the terminal bus bar opening 400H1. The exposed terminal bus bar 411 may be connected to an HV line 800 to be described later, and may be electrically connected to another battery module 100 or may be connected to a battery disconnect unit (BDU) module.

A method of connecting the electrode lead 111 and the bus bar 412 or a method of connecting the electrode lead 111 and the terminal bus bar 411 is not particularly limited, and a method such as welding may be applied.

The sensing assembly 420 may include a module connector 421 and a connection cable 422 connecting the module connector 421 and the battery cells 110. For example, the connection cable 422 may be connected to the bus bar 412 to transfer voltage information of the battery cell 110 to the module connector 421. In addition, the connection cable 422 may be connected to a sensor positioned on an outer periphery of the battery cell 110 to transfer temperature information of the battery cell 110 to the module connector 421. The connection cable 422 may be a flexible printed circuit board (FPCB) or a flexible flat cable (FFC).

A module connector opening 400H2 may be formed in the end plate 400, and the module connector 421 may be exposed to the outside through the module connector opening 400H2. The exposed module connector 421 may be connected to an LV line 900 to be described later, and may be connected to a battery management system (BMS) module.

Hereinafter, the heat sink 300 according to the present embodiment will be described in detail.

FIG. 7 illustrates a perspective view of the battery module of FIG. 3 viewed from a bottom to a top of the battery module along a z-axis direction.

Referring to FIG. 4 and FIG. 7 together, the bottom portion 210a of the module frame 200 may constitute an upper plate of the heat sink 300, and the bottom portion 210a of the module frame 200 and the heat sink 300 may form a refrigerant path.

Specifically, the heat sink 300 may be positioned below the bottom portion 210a of the module frame 200. The heat sink 300 may include a lower plate 310 that forms a skeleton of the heat sink 300 and is directly connected to the bottom portion 210a of the module frame 200 by welding, etc., and a recess portion 340 downwardly formed from the lower plate 310. The recess portion 340 is a path through which a refrigerant flows. In addition, the heat sink 300 according to the present embodiment may include a heat sink protrusion 300P protruding from one side of the heat sink 300 to a portion where the module frame protrusion 211 is positioned. That is, the recess portion 340 may extend to two heat sink protrusions 300P, and the two heat sink protrusions 300P may be a portion through which a refrigerant is introduced and a portion through which the refrigerant is discharged, respectively. To this end, the heat sink protrusions 300P may be positioned to correspond to the module frame protrusion 211 in which the cooling port 500 is formed.

The heat sink protrusions 300P and the module frame protrusion 211 may be directly connected to each other by welding or the like.

The recess portion 340 of the heat sink 300 corresponds to a portion in which the lower plate 310 is recessed downward. The recessed portion 340 may be a U-shaped pipe with a cross-section cut with an xz plane or a yz plane that is perpendicular to a direction in which a refrigerant passage extends, and the bottom portion 210a may be positioned at an open upper side of the U-shaped pipe. As the lower plate 310 of the heat sink 300 comes into contact with the bottom portion 210a, and a space between the recess portion 340 and the bottom portion 210a serves as a region through which a refrigerant flows, that is, a flow passage of the refrigerant. Accordingly, the bottom 210a of the module frame 200 may directly contact the refrigerant.

There is no particular limitation on the manufacturing method of the recess portion 340 of the heat sink 300, but it is possible to form the U-shaped recess portion 340 with an open upper side by providing a structure that is recessedly formed with respect to the plate-shaped heat sink 300.

The recess portion 340 may lead from one of the heat sink protrusions 300P to the other, as described above. The refrigerant supplied through the refrigerant injection port 500a is first introduced into the space between the recess portion 340 and the bottom portion 210a through the space between the first module frame protrusion and the heat sink protrusion 300P. Thereafter, the refrigerant moves along the recess portion 340, passes the space between the second module frame protrusion and the heat sink protrusion 300P, and is discharged through the refrigerant discharge port 500b.

Meanwhile, although not illustrated, a thermally conductive resin layer including a thermal resin may be positioned between the bottom 210a of the module frame 200 of FIG. 4 and the battery cell stack 120. The thermally conductive resin layer may be formed by applying the thermal resin to the bottom portion 210a and curing the applied thermal resin.

The thermally conductive resin may include a thermally conductive adhesive material, and specifically, may include at least one of a silicone material, a urethane material, or an acrylic material. The thermally conductive resin may serve to fix one or more battery cells 110 constituting the battery cell stack 120 by being liquid during application or being cured after application. In addition, heat generated in the battery cell 110 may be quickly transferred to the lower side of the battery module because of excellent thermal conductivity thereof.

The battery module 100 according to the present embodiment implements a cooling integrated structure of the module frame 200 and the heat sink 300 to further improve cooling performance. Since the bottom portion 210a of the module frame 200 serves to correspond to the top plate of the heat sink 300, the cooling integrated structure may be implemented. The cooling efficiency may be increased by direct cooling, and a space utilization rate of the battery module 100 and the battery pack 1000 in which the battery module 100 is mounted may be further improved through a structure in which the heat sink 300 is integrated with the bottom portion 210a of the module frame 200.

Specifically, heat generated in the battery cell 110 may be transferred to the outside of the battery module 100 through a thermally conductive resin layer (not illustrated) positioned between the battery cell stack 120 and the bottom portion 210a, the bottom portion 210a of the module frame 200, and the refrigerant. Due to the above configurations, a conventional cooling structure may be simplified to reduce a heat transfer passage and to reduce an air gap between each layer, thereby increasing cooling efficiency or performance. In particular, since the bottom portion 210a is constituted by the upper plate of the heat sink 300 and the bottom portion 210a directly contacts the coolant, more direct cooling is possible through the refrigerant.

In addition, by removing a part of the cooling structure, a height of the battery module 100 may be reduced, thereby reducing cost and increasing spatial utility. Further, since a plurality of battery modules 100 may be compactly arranged, capacity or output of the battery pack 1000 including the battery modules 100 may be increased.

Meanwhile, the bottom portion 210a of the module frame 200 may be joined to a portion of the lower plate 310 in which the recessed portion 340 is not formed in the heat sink 300 through welding. According to the present embodiment, it is possible to obtain an effect of supporting a load of the battery cell stack 120 accommodated in the module frame 200 and reinforcing rigidity of the battery module 100 in addition to improving the above-mentioned cooling performance through the integrated cooling structure of the bottom portion 210a of the module frame 200 and the heat sink 300. In addition, the refrigerant may flow without leakage in the depressed portion 340 formed inside the lower plate 310 by sealing the lower plate 310 and the bottom portion 210a of the module frame 200 through welding, etc.

The battery module 100 according to the present embodiment includes 32 to 48 battery cells 110, which is more than the conventional ones, in order to increase capacity and the like. However, since a number of battery cells 110 increases and a horizontal length of the battery module 100 increases, cooling efficiency of each battery cell 110 may decrease. Accordingly, the battery module 100 according to the present embodiment implements a cooling integrated structure through a structure of the heat sink 300, thereby increasing the cooling efficiency while increasing the number of battery cells 110. That is, the cooling-integrated large capacity battery module 100 may be formed.

For effective cooling, it may be preferable that the recessed portion 340 is formed over an entire area corresponding to the bottom portion 210a of the module frame 200. To this end, the recessed portion 340 may be bent at least once and lead from a first side to a second side. In particular, the depressed portion 340 may be preferably bent several times to form the depressed portion 340 over an entire area corresponding to the bottom portion 210a of the module frame 200. As the refrigerant moves from a start point to an end point of the refrigerant passage that is formed over the entire area corresponding to the bottom portion 210a of the module frame 200, efficient cooling of the entire area of the battery cell stack 120 may be achieved.

Meanwhile, the refrigerant is a medium for cooling, and there is no particular limitation, but may be a coolant.

Meanwhile a protrusion pattern 340D may be formed in the recess portion 340 of the heat sink 300 according to the present embodiment. In the case of a large-scaled battery module 100 in which the number of battery cells that are stacked, like the battery cell stack 120 according to the present embodiment, increases significantly compared to the prior art, the width of the refrigerant passage may be formed to be wider, so that a temperature deviation may be larger. As described above, the large-scaled battery module may include a case in which about 32 to 48 battery cells 110 are stacked in one battery module 100 compared to a case in which about 12 to 24 battery cells are stacked in one battery module. In this case, the protrusion pattern 340D according to the present embodiment has an effect of substantially reducing a width of a cooling passage, thereby minimizing a pressure drop and at the same time reducing a temperature deviation between widths of the refrigerant passage. Accordingly, it is possible to implement a uniform cooling effect.

Hereinafter, an arrangement structure of the battery modules, the pack refrigerant pipe assembly, and the pack refrigerant pipe housing according to the present embodiment will be described in detail with reference to FIGS. 8 to 11.

FIG. 8 illustrates an exploded perspective view showing battery modules, a pack refrigerant pipe assembly, and a pack refrigerant pipe housing included in the battery pack of FIG. 2. FIG. 9 illustrates an exploded perspective view showing a pack refrigerant pipe assembly, and a pack refrigerant pipe housing included in the battery pack of FIG. 8.

Referring to FIG. 8 and FIG. 9, the battery pack 1000 according to the present embodiment includes a plurality of battery modules 100, a pack refrigerant pipe assembly 600 connected to the battery modules 100, and a pack refrigerant pipe housing 700 for accommodating the pack refrigerant pipe assembly 600. The battery modules 100 may include a first battery module 100a and a second battery module 100b facing each other. The pack refrigerant pipe assembly 600 and the pack refrigerant pipe housing 700 are positioned between the first battery module 100a and the second battery module 100b.

More specifically, referring to FIG. 2, FIG. 4, and FIG. 8 together, the battery modules 100 may further include a third battery module 100c and a fourth battery module 100d facing each other. That is, the battery module 100 according to the present embodiment may include the first to fourth battery modules 100a, 100b, 100c, and 100d. The first and second battery modules 100a and 100b may be positioned along a direction (y-axis direction) that is perpendicular to a direction in which the battery cells 110 are stacked, and the third and fourth battery modules 100c and 100d may also be positioned along the direction (y-axis direction) that is perpendicular to the direction in which the battery cells 110 are stacked. The first battery module 100a and the second battery module 100b may be positioned such that their end plates 400 face each other. The third battery module 100c and the fourth battery module 100d may also be positioned such that their end plates 400 face each other.

In summary, the first to fourth battery modules 100a, 100b, 100c, and 100d may be arranged as a lattice type. As will be described later, the pack refrigerant pipe assembly 600 and the pack refrigerant pipe housing 700 are positioned to extend along between the first battery module 100a and the second battery module 100b, between the third battery module 100c and the fourth battery module 100d, and between the second battery module 100b and the fourth battery module 100d, to form a T-shaped structure.

The first to fourth battery modules 100a, 100b, 100c, and 100d may be large-scaled modules, to include 32 to 48 battery cells 110, and the battery pack 1000 may include the first to fourth battery modules 100a, 100b, 100c, and 100d. That is, according to the present embodiment, as the number of battery cells 110 included in the battery module 100 increases, the number of battery modules 100 included in the battery pack 1000 may be reduced. Ultimately, it is possible to reduce a number of components for a battery module, such as a fixing part or a cooling part, required for each battery module 100, thereby simplifying the structure and improving the assembly process. In addition, since the number of battery modules 100 is reduced and has a lattice-type arrangement structure, the HV line 800 or the LV line 900, which will be described later, may also be structurally simplified.

Referring to FIG. 3, FIG. 4, and FIG. 8 together, the cooling ports 500 formed in each of the battery modules 100a and 100b may all be positioned in a space between the first battery module 100a and the second battery module 100b. In other words, the module frame protrusion 211 of the first battery module 100a protrudes in a direction in which the second battery module 100b is positioned, and the module frame protrusion 211 of the second battery module 100b may protrude in a direction in which the first battery module 100a is positioned. The cooling port 500 may be positioned on the upper surface of each of the module frame protrusions 211.

In this case, the refrigerant injection port 500a of the first battery module 100a and the refrigerant discharge port 500b of the second battery module 100b may be positioned to face each other, and the refrigerant discharge port 500b of the first battery module 100a and the refrigerant injection port 500a of the second battery module 100b may be positioned to face each other. In addition, the refrigerant injection port 500a of the third battery module 100c and the refrigerant discharge port 500b of the fourth battery module 100d may be positioned to face each other, and the refrigerant discharge port 500b of the third battery module 100c and the refrigerant injection port 500a of the fourth battery module 100d may be positioned to face each other.

In the meantime, referring to FIG. 8 and FIG. 9, the pack refrigerant pipe assembly 600 may include a pack refrigerant pipe 610 and a connection port 620 connecting the pack refrigerant pipe 610 and the cooling port 500 of the battery module 100.

The pack refrigerant pipe 610 may include a main pack refrigerant pipe 611 connected to an inlet 720a and an outlet 730a, and a subpack refrigerant pipe 612 connecting the main pack refrigerant pipe 611 and the battery module 100. In particular, the subpack refrigerant pipe 612 may be connected to the cooling port 500 of the battery module 100 through the connection port 620. In addition, subpack refrigerant pipes 612 may cross each other to extend. One of the crossed subpack refrigerant pipes 612 may be a subpack refrigerant supply pipe 612a, and the other may be a subpack refrigerant discharge pipe 612b. The main pack refrigerant pipe 611 and the subpack refrigerant pipe 612 may form a T-shaped structure.

Since the pack refrigerant pipe 610 according to the present embodiment has an arrangement structure as described above, it is possible to implement a cooling integrated structure with the battery modules 100 in the battery pack 1000. Accordingly, it is possible to simultaneously improve cooling efficiency while increasing a space utilization rate. A height of the crossed subpack refrigerant supply pipe 612a and the height of the subpack refrigerant discharge pipe 612b may be different from each other in order to have the arrangement structure of the pack refrigerant pipe 610 as described above. The subpack refrigerant supply pipe 612a and the sub-pack refrigerant discharge pipe 612b may have different heights at some portions.

Meanwhile, the main pack refrigerant pipe 611 may include a main pack refrigerant supply pipe 611a and a main pack refrigerant discharge pipe 611b. The main pack refrigerant supply pipe 611a may be connected to the subpack refrigerant supply pipe 612a, and the main pack refrigerant discharge pipe 611b may be connected to the subpack refrigerant discharge pipe 612b.

FIG. 10 illustrates a perspective view showing a portion of each of a battery module, a pack refrigerant pipe, a pack refrigerant pipe housing, and a second gasket according to an embodiment of the present invention.

Referring to FIG. 8 to FIG. 10, the connection port 620 connects the cooling port 500 and the pack refrigerant pipe 610. The cooling port 500 may include a refrigerant injection port 500a for supplying a refrigerant to the heat sink 300 and a refrigerant discharge port 500b for discharging refrigerant from the heat sink 300, and the pack refrigerant pipe 610 may include a subpack refrigerant supply pipe 612a and a subpack refrigerant discharge pipe 612b.

In this case, the connection port 620 may connect between the refrigerant injection port 500a and the subpack refrigerant supply pipe 612a and between the refrigerant discharge port 500b and the subpack refrigerant discharge pipe 612b. The connection port 620 is connected to each of the refrigerant injection ports 500a for supplying a refrigerant to the battery modules 100 and each of the refrigerant discharge ports 500b for discharging the refrigerant from the battery modules 100.

The pack refrigerant pipe housing 700 accommodates the pack refrigerant pipe assembly 600. The battery modules 100 may be arranged as a lattice type, and the pack refrigerant pipe assembly 600 and the pack refrigerant pipe housing 700 may be arranged between the battery modules 100. In this case, the subpack refrigerant pipe 612 extends from a first end of the main pack refrigerant pipe 611 in opposite directions that are perpendicular to a longitudinal direction of the main pack refrigerant pipe 611, and the pack refrigerant pipe housing 700 may extend along portions where the main pack refrigerant pipe 611 and the subpack refrigerant pipe 612 extend.

Meanwhile, as described above, the main pack refrigerant pipe 611 may be connected to the inlet 720a and the outlet 730a. The pack refrigerant pipe housing 700 may include an inlet connection portion 720 and an outlet connection portion 730 that are respectively formed at positions corresponding to the inlet 720a and the outlet 730a. The inlet connection portion 720 and the outlet connection portion 730 may include through-hole portions into which the inlet 720a and the outlet 730a may be inserted, respectively.

The battery pack 1000 may be applied to transportation means such as electric vehicles and hybrids, and a refrigerant such as a coolant may leak due to an assembly defect or an accident while driving. The leaking refrigerant may penetrate into a plurality of components constituting the battery pack 1000, which may cause a fire or explosion. According to the present embodiment, the pack refrigerant pipe housing 700 may be formed to cover a bottom surface and side surfaces of the pack refrigerant pipe assembly 600 to enable the refrigerant leaking from the pack refrigerant pipe assembly 600 to stay inside the pack refrigerant pipe housing 700, thereby preventing the leaking refrigerant from penetrating into other components in the battery pack 1000. In this case, it is preferable to secure a maximum volume of the pack refrigerant pipe housing 700 by utilizing a space between the plurality of battery modules 100 such that the pack refrigerant pipe housing 700 can accommodate the leaking refrigerant as much as possible.

An open upper portion of the pack refrigerant pipe housing 700 may be covered by a housing cover 700C. Accordingly, it is possible to prevent the refrigerant leaking from the pack refrigerant pipe assembly 600 from leaking into an upper open space of the pack refrigerant pipe housing 700.

A first gasket 700G1 may be positioned between the pack refrigerant pipe housing 700 and the housing cover 700C. The first gasket 700G1 seals between the pack refrigerant pipe housing 700 and the housing cover 700C. The first gasket 700G1 may be formed along an upper edge of the pack refrigerant pipe housing 700. The housing cover 700C may be coupled to the first gasket 700G1 formed along the upper edge of the pack refrigerant pipe housing 700 to block the refrigerant leakage to an upper side of the pack refrigerant pipe housing 700.

Hereinafter, a connection relationship between the cooling port and the connection port and an arrangement and shape of a second gasket according to an embodiment of the present invention will be described in detail with reference to FIG. 10 to FIG. 12.

FIG. 11 illustrates a partial view showing a connection port and a cooling port according to an embodiment of the present invention. FIG. 12 illustrates a top plan view showing a battery pack when viewed from top to bottom such that a bottom surface of a pack refrigerant pipe housing is visible according to an embodiment of the present invention. In particular, for convenience of description, illustration of the pack refrigerant pipe housing and the second gasket is omitted in FIG. 11, and illustration of the housing cover and the pack refrigerant pipe assembly is omitted in FIG. 12.

Referring to FIG. 10 to FIG. 12, an opening 710P may be formed in a bottom surface of the pack refrigerant pipe housing 700 according to the present embodiment. A second gasket 700G2 may be coupled to a portion in which the opening 710P is formed.

Specifically, the second gasket 700G2 may be positioned between the module frame protrusion 211 and the pack refrigerant pipe housing 700 to seal between the module frame protrusion 211 and the pack refrigerant pipe housing 700. In this case, the cooling port 500 may be positioned on the upper surface of the module frame protrusion 211 and may penetrate the second gasket 700G2 and the opening 710P to upwardly protrude into the pack refrigerant pipe housing 700. In other words, the cooling port 500 may extend through the second gasket 700G2 and the opening 710P to be connected to the pack refrigerant pipe assembly 600, in particular, the connection port 620.

The connection port 620 may be coupled to the cooling port 500 by penetrating the opening 710P and the second gasket 700G2 downward. As illustrated in FIG. 10, the second gasket 700G2 may include a through hole through which the cooling port 500 or the connection port 620 may extend therethrough.

In the meantime, when the cooling port 500 is coupled to the connection ports 620, as illustrated in FIG. 11, the cooling port 500 is inserted and coupled to a lower side of the connection port 620, and the lower end of the connection port 620 may be in contact with the upper surface of the module frame protrusion 211. That is, the cooling port 500 and the connection port 620 may be coupled in a form in which the cooling port 500 is inserted into the connection port 620. As described above, in FIG. 11, the illustration of the pack refrigerant pipe housing 700 and the second gasket 700G2 is omitted for convenience of description, and in fact, as illustrated in FIG. 10, the second gasket 700G2 and the pack refrigerant pipe housing 700 may be positioned on the module frame protrusion 211.

Meanwhile, a sealing member 630 may be positioned between the cooling port 500 and the connection port 620.

The sealing member 630 may have a ring shape, and may be fitted between the cooling port 500 and the connection port 620. The sealing member 630 may be inserted into the connection port 620 together with the cooling port 500 while being inserted into the cooling port 500. The sealing member 630 may prevent the refrigerant from leaking through a gap between the cooling port 500 and the connection port 620.

As such, the pack refrigerant pipe assembly 600 positioned inside the pack refrigerant pipe housing 700 and the cooling port 500 for supplying and discharging refrigerant to and from the battery modules 100 are connected to each other to circulate the refrigerant, and the opening 710P is required to connect the pack refrigerant pipe assembly 600 and the cooling port 500. In addition, as in the present embodiment, the second gasket 700G2 may be formed on the outside of the opening 710P to seal between the bottom surface of the pack refrigerant pipe housing 700 and the module frame protrusion 211 where the cooling port 500 is formed, thereby preventing the refrigerant collected inside the pack refrigerant pipe housing 700 from leaking through the opening 710P. That is, it is possible to block leakage of the refrigerant to a lower side of the pack refrigerant pipe housing 700.

In summary, the battery pack 1000 according to the present embodiment may include battery modules 100, a pack refrigerant pipe assembly 600 having a refrigerant circulation structure with the battery modules 100, and a pack refrigerant pipe housing 700 accommodating the pack refrigerant pipe assembly 600, and may increase space utilization by intensively positioning the pack refrigerant pipe assembly 600 between the battery modules 100. Specifically, the module frame protrusion 211 of the first battery module 100a protrudes in a direction in which the second battery module 100b is positioned, the module frame protrusion 211 of the second battery module 100b may protrude in a direction in which the first battery module 100a is positioned, and the cooling port 500 is positioned on an upper surface of the module frame protrusion 211. That is, both the refrigerant injection port 500a and the refrigerant discharge port 500b formed in each of the battery modules 100a and 100b may be positioned in a space where the end plate 400 of the first battery module 100a and the end plate 400 of the second battery module 100b face each other.

The battery pack 1000 according to the exemplary embodiment is designed to arrange the cooling port 500 and the pack refrigerant pipe assembly 600 to supply or discharge a refrigerant in a space between the first battery module 100a and the second battery module 100b, and thus a cooling system of a refrigerant circulation structure may be intensively positioned between the battery modules 100. Accordingly, the cooling structure is simplified, and the space utilization inside the battery pack 1000 is increased. In addition, a refrigerant leakage prevention structure such as the pack refrigerant pipe housing 700 or the second gasket 700G2 is provided only in a space in which the end plates 400 face each other between the first battery module 100a and the second battery module 100b. That is, a space required for the refrigerant leakage prevention structure is limited depending on simplification of the cooling structure.

The pack refrigerant pipe assembly 600 according to an embodiment of the present invention may include a pack refrigerant pipe 610 and a connection port 620 connecting the pack refrigerant pipe 610 and the cooling port 500. The pack refrigerant pipe 610 may include a pack refrigerant supply pipe 610a and a pack refrigerant discharge pipe 610b. Herein, the pack refrigerant supply pipe 610a includes the main pack refrigerant supply pipe and the subpack refrigerant supply pipe described above, and the pack refrigerant discharge pipe 610b includes the main pack refrigerant discharge pipe and the subpack refrigerant discharge pipe described above. As described above, the cooling port 500 according to the present embodiment may include a refrigerant injection port 500a for supplying a refrigerant to the heat sink 300 and a refrigerant discharge port 500b for discharging the refrigerant from the heat sink 300, and the refrigerant injection port 500a and the refrigerant discharge port 500b may be respectively connected to the pack refrigerant supply pipe 610a and the pack refrigerant discharge pipe 610b. Hereinafter, an arrangement structure of an HV line and an LV line according to an embodiment of the present invention will be described in detail with reference to FIG. 13 to FIG. 15.

FIG. 13 illustrates a partial view showing an enlarged portion "B" of FIG. 2. FIG. 14 illustrates a top plan view showing the battery pack of FIG. 2 viewed in a −z-axis direction on an xy plane. FIG. 15 illustrates a cross-sectional view taken along a line C-C of FIG. 14. In this case, the HV line 800 and the LV line 900 are schematically illustrated in FIG. 14 and FIG. 15 for convenience of description.

First, referring to FIG. 3, FIG. 4, FIG. 6, FIG. 13 and FIG. 14 together, as described above, the battery module 100 according to the present embodiment may include a terminal bus bar 411 connected to the battery cell 110 and a sensing assembly 420 for transferring information of the battery cell 110, and the sensing assembly 420 may include a module connector 421.

The battery pack 1000 according to the present exemplary embodiment may include the high voltage (HV) line 800 and the low voltage (LV) line 900. In this case, the HV line 800 connected to the terminal bus bar 411 and the LV line 900 connected to the sensing assembly 420 may be positioned between the first battery module 100a and the second battery module 100b.

More specifically, in the end plate 400, the terminal bus bar 411 may be exposed through the terminal bus bar opening 400H1, and the module connector 421 of the sensing assembly 420 may be exposed through the module connector opening 400H2. The terminal bus bar 411 may be connected to the HV line 800, and the module connector 421 of the sensing assembly 420 may be connected to the LV line 900.

The end plate 400 of the first battery module 100a and the end plate 400 of the second battery module 100b may be positioned to face each other, and the HV line 800 and the LV line 900 may be positioned in a space where the end plate 400 of the first battery module 100a and the end plate 400 of the second battery module 100b face each other.

Similarly, the end plate 400 of the third battery module 100c and the end plate 400 of the fourth battery module 100d may also be positioned to face each other, and the HV line 800 and the LV line 900 may be positioned in a space where the end plate 400 of the third battery module 100c and the end plate 400 of the fourth battery module 100d face each other.

In the battery pack 1000 according to the present embodiment, the battery modules 100 may be arranged to face each other, and the HV line 800 and the LV line 900 may be positioned in a space therebetween, thereby simplifying and efficiently arranging the HV line 800 and the LV line 900 connected to the battery modules 100.

In addition, the HV line 800 directly connected to a BDU module 1200 may be positioned between the second battery module 100b and the fourth battery module 100d, and the LV line 900 directly connected to a BMS module 1300 may also be positioned between the second battery module 100b and the fourth battery module 100d. That is, the HV line 800 and the LV line 900 are positioned at a center portion of the battery modules 100 so that they are not greatly affected by external impact and the like. Accordingly, it is possible to reduce the possibility of a short circuit with respect to the HV line 800 and the LV line 900, and to improve insulation performance and safety of the battery pack 1000.

Hereinafter, a positional relationship between an HV line, an LV line, and a pack refrigerant pipe assembly according to the present embodiment will be described in detail.

Referring to FIG. 6, FIG. 13, FIG. 14, and FIG. 15 together, the battery pack may further include a battery disconnect unit (BDU) module 1200 connected to the HV line 800 to control the electrical connection of a plurality of battery modules, and a battery management system (BMS) module 1300 connected to the LV line 900 to monitor and control an operation of the battery modules 100.

Each of the battery modules 100 may be electrically connected to each other through the HV line 800, and finally may be connected to the BDU module 1200 through the HV line 800. That is, at least one of the battery modules 100 and the BDU module 1200 may be connected through the HV line 800. The BDU module 1200 is positioned between the battery module 100 and the inverter and is a module including a relay, a resistor, and the like. The BDU module 1200 is responsible for stably supplying or blocking power to a power system of a device and protecting the power system of the device when a fault current occurs.

Each of the battery modules 100 may be connected to the BMS module 1300 through the LV line 900 to transfer data of the temperature or voltage measured for the battery cells 110 inside the battery module 100 to the BMS module 1300. That is, at least one of the battery modules 100 and the BMS module 1300 may be connected through the LV line 900. The BMS module 1300 is responsible for managing the temperature or voltage of each battery module 100 based on the measured temperature or voltage data.

In this case, as shown in FIG. 13 or FIG. 15, the HV line 800 and the LV line 900 according to the present embodiment may be positioned above the pack refrigerant pipe assembly 600. More specifically, it may be positioned above the housing cover 700C.

As described above, the pack refrigerant pipe assembly 600 having a refrigerant circulation structure and the pack refrigerant pipe housing 700 accommodating the pack refrigerant pipe assembly 600 may be positioned in a space in which the end plates 400 of the battery modules 100 face each other. In this case, the HV line 800 and the LV line 900 according to the present embodiment may also be designed to be disposed in the space where the end plates 400 of the battery modules 100 face each other. That is, not only the cooling system of the refrigerant circulation structure, but also the control system of electrical connection and the sensing system of temperature and voltage management, may be intensively positioned between the battery modules 100. Accordingly, not only the cooling structure but also the connection structure and the sensing structure between the battery modules are simplified, and the space utilization inside the battery pack 1000 is increased.

In addition, the battery pack 1000 according to the present embodiment may be applied to transportation means such as electric vehicles and hybrids, and a refrigerant such as a coolant may leak due to an assembly defect or an accident while driving. According to the present embodiment, even when the refrigerant leaks from the pack refrigerant pipe assembly 600, the leaking refrigerant does not contact the HV line 800 and the LV line 900 to prevent a short circuit from occurring. That is, firstly, the pack refrigerant pipe assembly 600 may be accommodated in the pack refrigerant pipe housing 700 to prevent problems due to refrigerant leakage, and secondly, the HV line 800 and the LV line 900 may be positioned above the housing cover 700C to improve insulation performance of the battery pack 1000. FIG. 16 illustrates a partial perspective view showing a connection relationship between battery modules and a pack refrigerant pipe assembly included in the battery pack of FIG. 2. FIG. 17 illustrates a top plan view showing a connection relationship between battery modules and a pack refrigerant pipe assembly included in the battery pack of FIG. 2 as viewed on an xy plane. In FIG. 16, illustration of the pack refrigerant pipe housing and the housing cover is omitted for convenience of description.

Referring to FIG. 4, FIG. 16, and FIG. 17, the battery modules 100 according to the present embodiment may include first to fourth battery modules 100a, 100b, 100c, and 100d. The first battery module 100a and the second battery module 100b may be positioned to face the end plates 400, and the third battery module 100c and the fourth battery module 100d may be positioned to face the end plates 400. A refrigerant injection port 500a and a refrigerant discharge port 500b may be positioned between the first battery module 100a and the second battery module 100b and between the third battery module 100c and the fourth battery module 100d.

In this case, the pack refrigerant pipe 610 may be positioned to extend along one direction between the first battery module 100a and the second battery module 100b and between the third battery module 100c and the fourth battery module 100d. In addition, as described in FIG. 9, the pack refrigerant pipe 610 includes the main pack refrigerant pipe 611 and the subpack refrigerant pipe 612 extending in opposite directions that are perpendicular to the longitudinal direction of the main pack refrigerant pipe 611.

Accordingly, the pack refrigerant pipe housing 700 may include a first portion 700a that extends in one direction between the first battery module 100a and the second battery module 100b and between the third battery module 100c and the fourth battery module 100d, and a second portion 700b that extends in a direction that is perpendicular to the one direction between the second battery module 100b and the fourth battery module 100d. That is, when viewed from above as in FIG. 17, the pack refrigerant pipe housing 700 including the first portion 700a and the second portion 700b may form a T-shaped structure. The subpack refrigerant pipe 612 (refer to FIG. 7) is accommodated in the first portion 700a, and the main pack refrigerant pipe 611 (refer to FIG. 7) is accommodated in the second portion 700b.

In the meantime, as the cooling port 500 is positioned as above, the pack refrigerant supply pipe 610a and the pack refrigerant discharge pipe 610b may extend while crossing each other. It is possible to implement the integrated structure of the battery modules 100 and the cooling structure in the battery pack 1000 and improve the cooling efficiency while increasing the space utilization rate by having the arrangement structure of this pack refrigerant pipe 610. In other words, the refrigerant injection port 500a formed in the first battery module 100a and the refrigerant discharge port 500b formed in the second battery module 100b are arranged to face each other, and then the pack refrigerant supply pipe 610a and the pack refrigerant discharge pipe 610b cross each other so as to be connected to the refrigerant injection port 500a and the refrigerant discharge port 500b, respectively, so that one pack refrigerant supply pipe 610a and one pack refrigerant discharge pipe 610*b* are configured to be connected to the battery modules 100*a*, 100*b*, 100*c*, and 100*d*, respectively. Accordingly, the battery modules 100 and the pack refrigerant pipe 610 may be efficiently positioned without unnecessary space waste. In addition, since a number of cooling components required for each of the battery modules 100*a*, 100*b*, 100*c*, and 100*d* can be reduced and the structure can be simplified, assembly processability may be improved.

Meanwhile, referring back to FIG. 1, the battery pack 1000 according to the present embodiment may include a pack cover 1400 covering the pack frame 1100 and a pack gasket assembly 1800 positioned between the pack frame 1100 and the pack cover 1400 for sealing. In addition, a module fixing bar 1500 is positioned on each of the battery modules 100 to fix the battery modules 100.

Meanwhile, an upper member 1610 and a lower member 1620 may be positioned at upper and lower portions of each of the battery modules 100, respectively. The upper member 1610 and the lower member 1620 may each be configured for impact mitigation and stable arrangement of the battery modules 100, and may be a pad-shaped member or a foam-shaped member.

In addition, the battery pack 1000 according to the present embodiment may include a vertical beam 1710 and a horizontal beam 1720 surrounding edges of the battery modules 100. Specifically, it may include two vertical beams 1710 and two horizontal beams 1720 surrounding outer edges of the four battery cells. In addition, an inner boundary of the four battery cells may be positioned to intersect the pack refrigerant pipe housing 700 and one horizontal beam 1720 in a cross shape. The vertical beam 1710 and the two horizontal beams 1720 may have a columnar structure made of a material such as steel.

The battery modules 100 may be spatially separated from neighboring battery modules by the vertical beam 1710, the horizontal beam 1720, and the pack refrigerant pipe housing 700. As a result, even when a high temperature, a high pressure gas, and a flame are generated by an overvoltage, and an overcurrent or overheating (heat issue) in any one battery module 100 occurs, they may be blocked from being transferred to the peripheral module, and thus additional occurrence of the heat issue and the like may be prevented. In addition, in normal times when such a heat issue does not occur, the vertical beam 1710, the horizontal beam 1720, and the pack refrigerant pipe housing 700 may serve as a structure for stably supporting the battery modules 100, thereby improving rigidity of the entire battery pack 1000.

In the present embodiment, terms indicating directions such as front, back, left, right, up, and down are used, but these terms are for convenience of description only, and may vary depending on a position of an object or a position of an observer.

The battery pack according to the present embodiment described above may be applied to various devices. Specifically, it may be applied to a transportation apparatus such as an electric bicycle, an electric vehicle, a hybrid vehicle, and the like, or an energy storage system, but is not limited thereto, and may be applied to various devices that can use rechargeable batteries.

While this invention has been described in connection with what is presently considered to be practical embodiments, it is to be understood that the invention is not limited to the disclosed embodiments, but, on the contrary, is intended to cover various modifications and equivalent arrangements included within the spirit and scope greater than or equal to appended claims.

DESCRIPTION OF SYMBOLS

100: battery module
110: battery cell
200: module frame
300: heat sink
500: cooling port
600: pack refrigerant pipe assembly
700: pack refrigerant pipe housing
800: HV line
900: LV line

The invention claimed is:

1. A battery pack comprising:
a plurality of battery modules configured to include a battery cell stack in which a plurality of battery cells are stacked, a module frame accommodating the battery cell stack, and a heat sink positioned under a bottom portion of the module frame;
a pack frame configured to accommodate the plurality of battery modules;
a pack refrigerant pipe assembly connected to the plurality of battery modules;
a pack refrigerant pipe housing configured to accommodate the pack refrigerant pipe assembly; and
a housing cover configured to cover an upper portion of the pack refrigerant pipe housing,
wherein the plurality of battery modules include a first battery module and a second battery module facing each other,
wherein the pack refrigerant pipe assembly and the pack refrigerant pipe housing are positioned between the first battery module and the second battery module, and
wherein an HV line and an LV line are positioned above the housing cover and provide insulation for the battery pack.

2. The battery pack of claim 1, wherein the plurality of battery modules each include cooling ports to supply a refrigerant to the heat sink and discharge the refrigerant from the heat sink,
wherein an opening is formed in a bottom surface of the pack refrigerant pipe housing, and
wherein the cooling ports are connected to the pack refrigerant pipe assembly through the opening.

3. The battery pack of claim 2, wherein the cooling ports include a refrigerant injection port for supplying the refrigerant to the heat sink and a refrigerant discharge port for discharging the refrigerant from the heat sink.

4. The battery pack of claim 2, wherein:
the module frame includes a module frame protrusion protruding from the bottom portion of the module frame, and
the cooling ports are positioned on an upper surface of the module frame protrusion to extend through the opening and to be connected to the pack refrigerant pipe assembly.

5. The battery pack of claim 4, wherein:
the module frame protrusion of the first battery module protrudes in a direction in which the second battery module is positioned, and
the module frame protrusion of the second battery module protrudes in a direction in which the first battery module is positioned.

6. The battery pack of claim 2, wherein:
the pack refrigerant pipe assembly includes a pack refrigerant pipe and a connection port connecting the pack refrigerant pipe and the cooling ports, and the connection port penetrates the opening to be coupled to the cooling ports.

7. The battery pack of claim 1, wherein:
the plurality of battery modules further includes a third battery module and a fourth battery module facing each other, and
the pack refrigerant pipe assembly and the pack refrigerant pipe housing are positioned to extend between the first battery module and the second battery module, between the third battery module and the fourth battery module, and between the second battery module and the fourth battery module, to form a T-shaped structure.

8. The battery pack of claim 1, wherein:
the plurality of battery modules each include a terminal bus bar connected to the plurality of battery cells and a sensing assembly for transferring information of the plurality of battery cells, and
the HV line connected to the terminal bus bar and the LV line connected to the sensing assembly are positioned between the first battery module and the second battery module.

9. The battery pack of claim 8, wherein:
the plurality of battery modules further includes an end plate bonded to the module frame, respectively,
the terminal bus bar and the sensing assembly are respectively exposed to be connected to the HV line and the LV line in the end plate, and
the first battery module and the second battery module are arranged such that the end plate of the first battery module and the end plate of the second battery module face each other.

10. The battery pack of claim 8, further comprising a battery disconnect unit (BDU) module configured to control electrical connection of the plurality of battery modules and a battery management system (BMS) module configured to monitor and control an operation of the plurality of battery modules,
wherein at least one of the plurality of battery modules and the BDU module are connected through the HV line, and
wherein at least one of the plurality of battery modules and the BMS module are connected through the LV line.

11. The battery pack of claim 1, wherein:
the bottom portion of the module frame and the heat sink constitute a path of the refrigerant, and
the bottom portion of the module frame is in contact with the refrigerant.

12. The battery pack of claim 1, wherein the heat sink includes a lower plate bonded to the bottom portion of the module frame and a recess portion formed downwardly from the lower plate.

13. The battery pack of claim 1, wherein:
the plurality of battery cells are each a pouch-type battery cell having a rectangular sheet structure, and
the plurality of battery modules include 32 to 45 battery cells.

14. A device comprising the battery pack according to claim 1.

15. The battery pack of claim 1, further comprising a gasket positioned between the pack refrigerant pipe housing and the housing cover, the gasket sealing the pack refrigerant pipe housing and the housing cover along lengths of the pack refrigerant pipe housing and the housing cover.

16. A battery pack comprising:
a plurality of battery modules configured to include a battery cell stack in which a plurality of battery cells are stacked, a module frame accommodating the battery cell stack, and a heat sink positioned under a bottom portion of the module frame;
a pack frame configured to accommodate the plurality of battery modules;
a pack refrigerant pipe assembly connected to the plurality of battery modules; and
a pack refrigerant pipe housing configured to accommodate the pack refrigerant pipe assembly,
wherein the plurality of battery modules include a first battery module and a second battery module facing each other,
wherein the pack refrigerant pipe assembly and the pack refrigerant pipe housing are positioned between the first battery module and the second battery module,
wherein the plurality of battery modules each include cooling ports to supply a refrigerant to the heat sink and discharge the refrigerant from the heat sink,
wherein an opening is formed in a bottom surface of the pack refrigerant pipe housing, and
wherein the cooling ports are connected to the pack refrigerant pipe assembly through the opening, and
wherein:
the module frame includes a module frame protrusion protruding from the bottom portion of the module frame, and
the cooling ports are positioned on an upper surface of the module frame protrusion to extend through the opening and to be connected to the pack refrigerant pipe assembly.

17. A battery pack comprising:
a plurality of battery modules configured to include a battery cell stack in which a plurality of battery cells are stacked, a module frame accommodating the battery cell stack, and a heat sink positioned under a bottom portion of the module frame;
a pack frame configured to accommodate the plurality of battery modules;
a pack refrigerant pipe assembly connected to the plurality of battery modules; and
a pack refrigerant pipe housing configured to accommodate the pack refrigerant pipe assembly,
wherein the plurality of battery modules include a first battery module and a second battery module facing each other,
wherein the pack refrigerant pipe assembly and the pack refrigerant pipe housing are positioned between the first battery module and the second battery module, and
wherein:
the plurality of battery modules further includes a third battery module and a fourth battery module facing each other, and
the pack refrigerant pipe assembly and the pack refrigerant pipe housing are positioned to extend between the first battery module and the second battery module, between the third battery module and the fourth battery module, and between the second battery module and the fourth battery module, to form a T-shaped structure.

* * * * *